US010919786B2

(12) United States Patent
Li et al.

(10) Patent No.: US 10,919,786 B2
(45) Date of Patent: Feb. 16, 2021

(54) ORGANIC-POLLUTION-RESISTANT ION EXCHANGE RESIN AND PREPARATION METHOD AND APPLICATION THEREOF

(71) Applicant: Nanjing University, Nanjing (CN)

(72) Inventors: Aimin Li, Nanjing (CN); Haibo Li, Nanjing (CN); Chendong Shuang, Nanjing (CN); Qing Zhou, Nanjing (CN); Hu Yang, Nanjing (CN); Mancheng Zhang, Nanjing (CN); Yang Zhou, Nanjing (CN)

(73) Assignee: Nanjing University, Nanjing (CN)

( * ) Notice: Subject to any disclaimer, the term of this patent is extended or adjusted under 35 U.S.C. 154(b) by 559 days.

(21) Appl. No.: 14/914,547

(22) PCT Filed: Aug. 27, 2014

(86) PCT No.: PCT/CN2014/085307
§ 371 (c)(1),
(2) Date: Feb. 25, 2016

(87) PCT Pub. No.: WO2015/027921
PCT Pub. Date: Mar. 5, 2015

(65) Prior Publication Data
US 2016/0207796 A1    Jul. 21, 2016

(30) Foreign Application Priority Data

Aug. 30, 2013    (CN) .......................... 2013 1 0388374

(51) Int. Cl.
*C02F 1/42*    (2006.01)
*B01J 39/20*    (2006.01)
(Continued)

(52) U.S. Cl.
CPC ................. *C02F 1/42* (2013.01); *B01J 39/17* (2017.01); *B01J 39/20* (2013.01); *B01J 41/14* (2013.01);
(Continued)

(58) Field of Classification Search
CPC .... C02F 1/42; B01J 39/20; B01J 39/17; B01J 41/09; B01J 41/10; B01J 41/12;
(Continued)

(56) References Cited

U.S. PATENT DOCUMENTS 4,323,664 A * 4/1982 Mukoyama ............... C08F 2/20
526/336
4,933,372 A * 6/1990 Feibush .................... B01J 20/26
521/122

(Continued)

*Primary Examiner* — Kregg T Brooks
(74) *Attorney, Agent, or Firm* — WEN IP LLC; Zhihua Han

(57) ABSTRACT

Implementations herein relate to a method for preparing organic-pollution-resistant ion exchange resins and application thereof. The method includes adding modified inorganic particles to prepare novel ion exchange resins containing inorganic particles modified by a parcel modifier. A weight ratio between the monomer of the ion exchange resins and the modified inorganic particles is about 0.1% to 30%. The method may increase moisture content of the resins 3 to 30% such as to improve the structures of the resins, and therefore increase the regeneration efficiency 0.4 to 70%, as compared to conventions resins. The method improves resistance of resins to organic pollution, increases regeneration efficiency, and extends service life of the resins. In the process of water treatment, the ion exchange resin of the implementations may be regenerated with long-term stability. In addition to securing the water treatment efficiency, the method may avoid frequent replacement operations and lower the costs.

9 Claims, 14 Drawing Sheets

(51) Int. Cl.

| | |
|---|---|
| B01J 41/14 | (2006.01) |
| C08F 2/20 | (2006.01) |
| C08F 292/00 | (2006.01) |
| B01J 39/17 | (2017.01) |
| C02F 103/16 | (2006.01) |
| C02F 103/32 | (2006.01) |
| C08F 220/06 | (2006.01) |
| C02F 103/30 | (2006.01) |
| C08F 212/08 | (2006.01) |
| C08F 220/44 | (2006.01) |
| C08F 220/32 | (2006.01) |
| C02F 101/10 | (2006.01) |
| C02F 101/18 | (2006.01) |
| C02F 101/20 | (2006.01) |
| C02F 101/22 | (2006.01) |
| C02F 101/30 | (2006.01) |
| C02F 101/34 | (2006.01) |
| C02F 103/00 | (2006.01) |
| C02F 103/34 | (2006.01) |

(52) U.S. Cl.
CPC ............. *C08F 2/20* (2013.01); *C08F 292/00* (2013.01); *C02F 2001/422* (2013.01); *C02F 2001/425* (2013.01); *C02F 2101/103* (2013.01); *C02F 2101/18* (2013.01); *C02F 2101/20* (2013.01); *C02F 2101/22* (2013.01); *C02F 2101/308* (2013.01); *C02F 2101/34* (2013.01); *C02F 2103/007* (2013.01); *C02F 2103/16* (2013.01); *C02F 2103/30* (2013.01); *C02F 2103/32* (2013.01); *C02F 2103/34* (2013.01); *C08F 212/08* (2013.01); *C08F 220/06* (2013.01); *C08F 220/325* (2020.02); *C08F 220/44* (2013.01)

(58) Field of Classification Search
CPC . B01J 41/14; C08F 292/00; C08F 2/18; C08F 2/20; C08K 9/04; C08K 9/06
USPC .......................................................... 521/25
See application file for complete search history.

(56) References Cited

U.S. PATENT DOCUMENTS

| | | | |
|---|---|---|---|
| 5,047,438 A * | 9/1991 | Feibush | B01J 20/26 521/122 |
| 5,900,146 A * | 5/1999 | Ballard | C08F 2/44 210/222 |
| 2004/0110864 A1* | 6/2004 | Hecht | C09J 4/00 523/113 |
| 2016/0207796 A1* | 7/2016 | Li | C02F 1/42 |
| 2017/0044031 A1* | 2/2017 | Li | B01J 49/00 |

* cited by examiner

ORGANIC-POLLUTION-RESISTANT ION EXCHANGE RESIN AND PREPARATION METHOD AND APPLICATION THEREOF

CROSS REFERENCE TO RELATED APPLICATION

This application is a national stage application of International application number PCT/CN2014/085307, filed Aug. 27, 2014, titled "Organic-Pollution-Resistant Ion Exchange Resin and Preparation Method and Application Thereof," which claims the priority benefit of Chinese Patent Application No. 201310388374.0, filed on Aug. 30, 2013, which is hereby incorporated by reference in its entirety.

TECHNICAL FIELD

The implementations relate to a method for preparing organic-pollution-resistant ion exchange resins and application thereof, and particularly to a method for improving moisture content of organic-pollution-resistant ion exchange resins by adding inorganic particles. The implementations relate to the technical field for improving performance of ion exchange resins.

BACKGROUND

Ion exchange resins are widely used polymer particles having charge of the functional groups of the water. Their water treatment has a big tolerance range of water quality, has high hydraulic load handling stability, may avoid secondary pollution caused by the administration. Their operations are easy and costs are low. Because of its functional properties such as exchange, adsorption, etc., they can effectively recover heavy metal ions after removing organic matters from wastewater. In practice, for water treatment, the ion exchange resins not only need to have a high exchange capacity but also need to have a highly efficient and stable regeneration performance. Increasing of the regeneration property of resins not only is beneficial to the stability of the treatment effect, but also helps to increase the service life of the resins as well as to reduce costs.

Currently, a lot of work has focused on how to improve performance or adsorption separation efficiency of the resins. In addition to the performance and separation efficiency, studies have been done to the regeneration process. However, few techniques have been provided as to improving regeneration efficiency or pollution resistance. CN101537375 and CN102463155A disclosed macroporous anion exchange resins. By increasing the proportion of the resin channels, these resins improve the exchange capacity and rate of ion exchange resins. CN102580791A disclosed modified lysine macroporous amphoteric ion-exchange resins, which enhance ion exchange capacity and remove a variety of contaminants. However, these works are not related to regeneration of the reins. In fact, the increase of tunnels and specific surface areas is harmful to the regeneration of the resins and increase the pollution of organic matters to the resins. Li Youming et al., in ion exchange resin recovery contamination and Technology of 2011 2 "Pollution Control Technology", pointed out: more channels result in pore clogging in resins, hydrophobic organic compounds once clogged pores will repel charged species for the exchange such that the resin layer is formed on the surface contamination, resulting resin regeneration difficulties, and fail soon.

In addition to tunnel effects, hydrophilic resin regeneration performance has an important influence. Uses of the polar group-modified resins can increase moisture content, and, to a certain extent, resist pollution of hydrophobic organics. As for pollution resistance, styrenic strong base type II resins are better than type I mainly because of the introduction of dimethylethanolamine hydroxyl group, which is hydrophilic. However, styrene strong base type II resin is still easier to be contaminated because of its styrene resin skeleton. Yang Chonghao et al., in Vol. 19, No. 1, "North China Water Conservancy and Hydropower College," pointed out: in a resin synthesis process, the main polymerization of styrene and divinylbenzene, since the rates of polymerization of different isomers of divinylbenzene three (p, m, o) iso are different, has different radical impacts on velocity, resulting in uneven resin structures, poor performance. In water treatment, organic ions easily stay in parts of close crosslinked styrene in the resins such as to prevent regeneration by taking a lot of active points. In contrast, resins using hydrophilic acrylic and divinylbenzene polymerization, by reducing adsorption of the skeleton to an organic acid, have reduced rate of adsorption of organic acids. However, Z Beril Gönder et al., in 2006 189 Desalination, pointed out: acrylic anion exchange resins can also be easily contaminated by organic compounds in water, and its removal rate declines with the times of uses. In addition, Wang Yun, in 2000 first four "Industrial Water & Wastewater," pointed out: strong base resins are susceptible to organic pollution, resins easily fail, water quality curve or pollution index has to be used to determine, and the timely replacement resin protect water quality are needed. SUN Yu-hong et al., in 2006 22 "Technology Information," pointed out that: regeneration methods are need to reduce operating costs. Thus, pollution resistance of the resins is a key issue.

Currently, there is no use of inorganic particles and resin monomers to improve the performance of pollution resistance. Although the inorganic particles and resin monomers have been reported, most of them focus on separation properties of resins. Due to improper selection of wrapping of modifiers, pollution resistance may fall instead of rising. For example, U.S. Pat. No. 5,900,146 disclosed a method for preparing magnetic particles by adding $Fe_2O_3$ for separation of magnetic resins, which can quickly settle separation. However, this method used Solsperse-24000 Hyperdispersant as a modifier for magnetic inorganic particles. In the polymerization process, the combination with $Fe_2O_3$ and Solsperse-24000 resin easily leads to a tighter structure and the accumulation of more organic resins, resulting in reduced service life thereof. Krystal M. Walker et al., in 2011 Vol. 45, No. 9 "Water Research," pointed out: only 20 times after regeneration, the removal rates of these resins decreases 10%. Meanwhile, Tien Vinh Nguyen et al., get the same results in 2011, 276 of Volume 1-3 "Desalination that" during and after the above-mentioned magnetic resin regeneration of four times, the removal rates for treating sewage decreased by 25%. Similarly, in the disclosed magnetic CN102641753A, strong base of ion exchange resins has increased pollution levels when adding oleic acid as a modifier of magnetic inorganic particles to promote the integration of the magnetic particles and the inorganic oil phase. Thus, when selecting inorganic particles for the ion exchange resins, regeneration properties have to be considered. If inappropriate inorganic particles and/or modifiers are selected or improper modification methods are implemented, the resulting resins may have enhanced hydrophobic and compacted mesh structures, which are harmful to organic-pollution-resistance of the resins. At the same time, frequency of reuse will be reduced.

In summary, how to improve the ion exchange resin regeneration efficiency and service life for water treatment is an urgent issue for promoting applications of ion exchange resins.

SUMMARY

1. Problems. Under current techniques, ion exchange resins have problems such as a low removal rate and short life. Implementations herein relate to organic-pollution-resistant ion exchange resins and applications thereof. The implementations improve resistance of resins to organic pollution, increase regeneration efficiency, and extend service life of the resins.

2. Solutions. To solve the problems, the implementations include adding modified inorganic particles into the structure of ion exchange resins to prepare the novel ion exchange resins containing the modified inorganic particles. A weight ratio between the monomer of the ion exchange resins and the modified inorganic particles is about 0.1% to 30%.

As compared to the conventional ion exchange resins, moisture content of the ion exchange resins of the implementations (named of the modified ion exchange resins) increases 3% to 30%. During the treatment of water, regeneration efficiency of the modified ion exchange resins increases 0.4% to 70%. The specific operations are as follows.

A method for preparing organic-pollution-resistant ion exchange resins may include the following operations.

(1) Preparation of an oil phase: mixing a monomer, a crosslinking agent, and an initiator to obtain the oil phase. A weight ratio between the monomer and the crosslinking agent is about 1:0.02 to 0.45, a weight ratio between the monomer and the initiator is about 1:0.003 to 0.15, and the monomer includes at least one of acrylic acid, methacrylic acid, methyl acrylate, ethyl acrylate, butyl acrylate, methyl methacrylate, butyl methacrylate, acrylonitrile, glycidyl methacrylate, styrene, p-chlorostyrene, divinylbenzene, nitrostyrene, dichloro styrene, methyl styrene polychloroprene, methyl cellulose, carboxymethyl cellulose, sodium alginate, chitosan or derivatives thereof.

(2) Preparation of a water phase: adding 0.2 to 3% by weight of a dispersant to the water phase. A weight ratio between the water phase and the oil phase is about 1:0.4 to 1, and the dispersant includes at least one of polyvinyl alcohol, gelatin, starch, methyl cellulose and derivatives thereof, calcium carbonate, calcium phosphate, talc, diatomaceous earth, bentonite, salt, or silicate.

(3) Modification of inorganic particles: adding inorganic particles to a methanol solution to obtain a mixture, stirring the mixture at 20° C. to 90° C. with 30 to 250 rpm for 0.5 h to 4 h, adding a modifier to the mixture and stirring the mixture for 0.5 h to 10 h, and drying the mixture. A weight ratio between the inorganic particles and the methanol solution is about 1:3 to 10, and a weight ratio between the modifier and the inorganic particles is about 1:0.05 to 5.

(4) Addition of the modified inorganic particles: adding the modified inorganic particles to the water phase, the oil phase, or a suspension polymerization system of the water phase and the oil phase. A weight ratio between the modified inorganic particles and the monomer is about 0.1% to 30%.

(5) Suspension Polymerization: adding the oil phase to the stirred water phase for polymerization, by keeping stirring at a speed of 100 to 1500 rpm, keeping the temperature at 50 to 80° C., and with a polymerization duration of 2 to 8 hours; afterwards, raising the temperature to 75 to 95° C., and keeping the temperature for about 1 to 15 hours; afterwards, cooling the products, separating resins from the polymerization reaction suspension, and drying the resins after extraction or washing.

Steps (1), (2), and (3) are adjustable and step 4 is performed prior to step 5.

The prepared resins are ion exchange resins containing the modified inorganic particles; as compared to ion exchange resins without the modified inorganic particles, moisture content of the ion exchange resins containing the modified inorganic particles increases 3% to 30%.

After regenerated about 50 times, regeneration efficiency of the ion exchange resins containing the modified inorganic particles increases 0.4% to 70% as compared to as compared to ion exchange resins without the modified inorganic particles.

In some implementations, the inorganic particles of step (3) are selected from at least one of kaolin, titanium dioxide, clay, talc, montmorillonite, calcium carbonate, iron, $TiO_2$, $WO_3$, $Fe_3O_4$, $SiO_2$, $ZrO_2$, $CuO$, $Al_2O_3$, or $ZnO$, and sizes of the inorganic particles are about 5 nm to 5000 nm. In some implementations, the drying in step (3) may include drying at 100° C.

In some implementations, the modifier includes at least one of γ-chloropropyl trichlorosilane, γ-chloropropyl trimethoxy silane, γ-chloropropyl triethoxysilane, γ-chloropropyl methyl dimethoxy silane, γ-aminopropyl triethoxysilane, γ-(methacryloxypropyl) trimethoxysilane, γ-glycidyl propyl trimethoxy silane, γ-mercaptopropyl trimethoxysilane, γ-mercaptopropyl triethoxysilane, γ-ureido propyl triethoxy silane, γ-(3,2-epoxypropoxy) methyl trimethoxysilane, γ-(ethylenediamine) aminopropyltrimethoxysilane, N-β-(aminoethyl)-γ-aminopropyl trimethoxy silane, N-β-(aminoethyl)-γ-aminopropyl methyl dimethoxy silane, vinyltriethoxysilane, vinyltrimethoxysilane, bis-[3-(triethoxysilyl) silylpropyl]tetrasulfide, diethylenetriaminepentaacetic aminopropyl trimethoxysilane, γ-ethylene amino triethoxysilane, A-(ethylenediamine-yl) methyl triethoxysilane, methyl triethoxysilane aniline, aniline methyl trimethoxysilane, bis (3-triethoxysilylpropyl silyl propyl) tetrasulfide carbon, cyclohexyl methyl dimethoxysilane, isopropyl tri (dioctyl pyrophosphate acyloxy) titanate, isopropyl tri (dioctyl phosphate acyloxy) titanate, isopropyl dioleate acyloxy group (acyloxy dioctyl phosphate) titanate, mono alkoxylated unsaturated fatty acid titanate, bis (dioctyl pyrophosphate group) ethylene titanate triethanolamine esters and chelates, pyrophosphate type monoalkoxy titanate type, a phosphoric acid compound class monoalkoxy titanates, alkanolamine titanate, di (octyl phenol ethoxylates) phosphate ester, tetraisopropyl bis (octyl acid phosphate group) titanate, polyester hyperdispersant, fatty alcohol ethoxylates, or cetyl trimethyl ammonium chloride.

In some implementations, the polyester Hyperdispersant belongs to Slosperse series of British ICI company, Elvacite series of American Dupont company, dispersants of Holland Efka company, or super dispersants of Germany BYK company.

When treating biochemical tailwater of municipal wastewater, as compared to ion exchange resins without the modified inorganic particles, regeneration efficiency by the ion exchange resins containing the modified inorganic particles to remove humic acid of the biochemical tailwater of municipal wastewater increases 1% to 50%, regeneration efficiency by the ion exchange resins containing the modified inorganic particles to remove tannic acid of the biochemical tailwater of municipalmunicipal wastewater increases 0.6% to 39%, regeneration efficiency by the ion exchange resins containing the modified inorganic particles to remove $UV_{254}$ of the biochemical tailwater of municipal-municipal wastewater increases 1% to 40%, regeneration efficiency by the ion exchange resins containing the modified inorganic particles to remove SUVA of the biochemical tailwater of municipal wastewater increases 0.8% to 46%.

When treating biochemical tailwater of municipal wastewater, as compared to ion exchange resins without the modified inorganic particles, regeneration efficiency by the ion exchange resins containing the modified inorganic particles to remove $UV_{254}$ of the biochemical tailwater of dyeing wastewater increases 1% to 40%, regeneration efficiency by the ion exchange resins containing the modified inorganic particles to remove TOC of the biochemical tailwater of dyeing wastewater increases 0.5% to 35%, regeneration efficiency by the ion exchange resins containing the modified inorganic particles to remove $COD_{Cr}$ of the biochemical tailwater of dyeing wastewater increases 1% to 28%.

When treating surface water, drinking water and food source wastewater, as compared to ion exchange resins without the modified inorganic particles, regeneration efficiency by the ion exchange resins containing the modified inorganic particles to remove DOC of the surface water increases 0.5% to 45%, regeneration efficiency by the ion exchange resins containing the modified inorganic particles to remove $UV_{254}$ of the surface water increases 1% to 40%, regeneration efficiency by the ion exchange resins containing the modified inorganic particles to remove $UV_{254}$ of the drinking water increases 1% to 40%, regeneration efficiency by the ion exchange resins containing the modified inorganic particles to remove $COD_{Cr}$ of the food wastewater increases 1% to 28%.

When treating metallurgical wastewater and coking wastewater, as compared to ion exchange resins without the modified inorganic particles, regeneration efficiency by the ion exchange resins containing the modified inorganic particles to remove $COD_{Cr}$ or CN— of the coking wastewater increases 1% to 55%, regeneration efficiency by the ion exchange resins containing the modified inorganic particles to remove $AsO_3^{3-}$ of the coking wastewater increases 1% to 55%.

When treating electroplating wastewater, as compared to ion exchange resins without the modified inorganic particles, regeneration efficiency by the ion exchange resins containing the modified inorganic particles to remove $Cu^{2+}$ of the electroplating wastewater increases 0.5% to 58%, regeneration efficiency by the ion exchange resins containing the modified inorganic particles to remove $Zn^{2+}$ of the electroplating wastewater increases 0.4% to 42%, and regeneration efficiency by the ion exchange resins containing the modified inorganic particles to remove $Cd^{2+}$, $Pb^{2+}$, $Ni^{2+}$, $Cr^{6+}$, or CN— of the electroplating wastewater increases 0.5% to 50%, as compared to ion exchange resins without the modified inorganic particles.

3. Beneficial effects. Compared to conventional techniques, the beneficial effects of the present invention are as follows.

(1) The implementations relate to a method for preparing organic-pollution-resistant ion exchange resins. The method includes adding modified inorganic particles to prepare novel ion exchange resins containing inorganic particles modified by a parcel modifier. A weight ratio between the monomer of the ion exchange resins and the modified inorganic particles is about 0.1% to 30%. The method improves resistance of resins to organic pollution, increases regeneration efficiency, and extends service life of the resins. In the process of water treatment, the ion exchange resin of the implementations may be regenerated with long-term stability. In addition to securing the water treatment efficiency, the method may avoid frequent replacement operations and lower the costs.

(2) The implementations further increase moisture content of the resin to improve the channels of the resins, facilitate exchanges, and increase resistance of anti-pollution of the resins. The method is also simple and effective.

(3) The inorganic particles of the implementations have a wide range of sources and low costs.

DETAILED DESCRIPTION OF THE PREFERRED EMBODIMENTS

Figure 1:
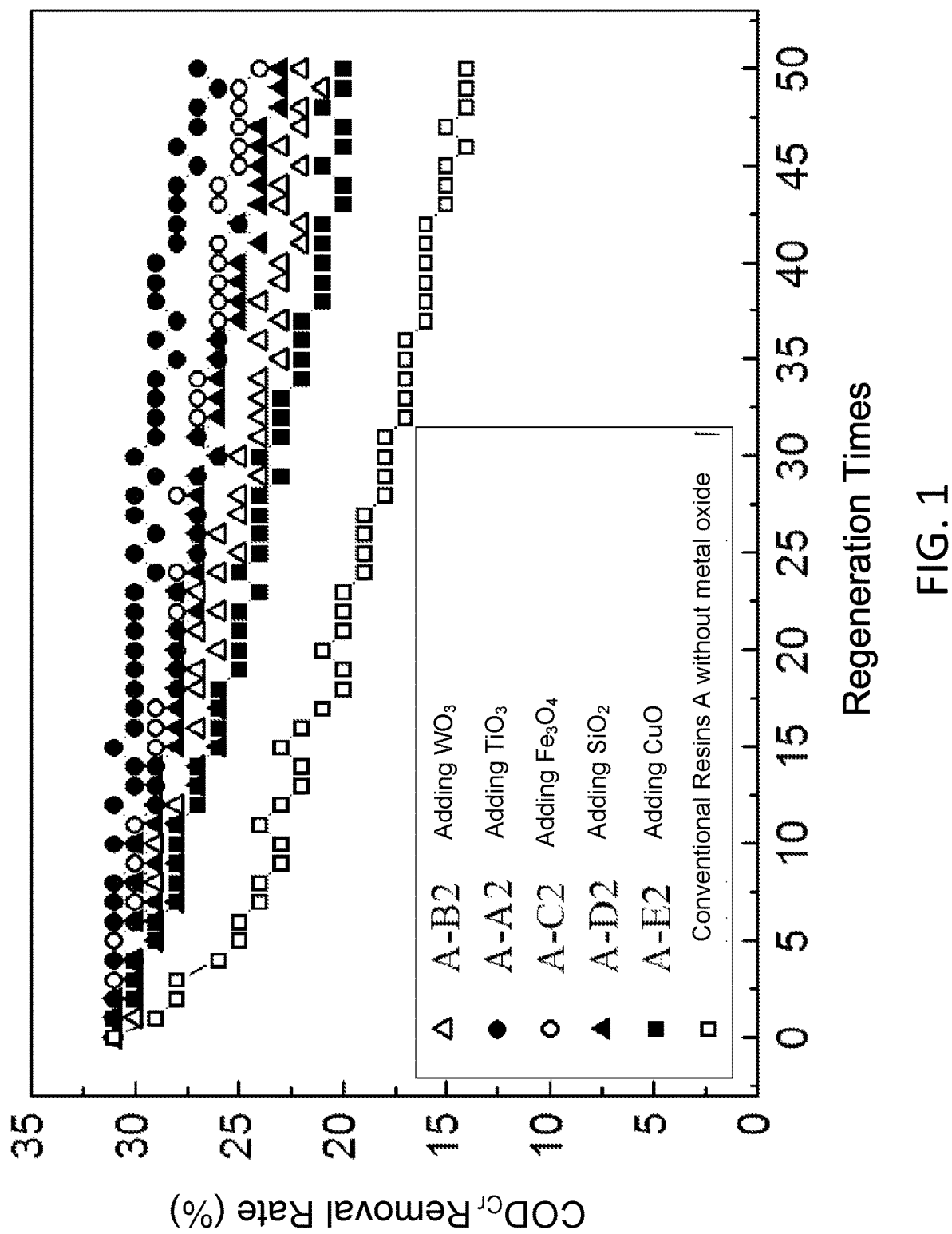
FIG. 1 is a relationship chart illustrating removal rates and regeneration times with respect to removal of $COD_{Cr}$ in dyeing wastewater using strong basic acrylic anion exchange resins containing and without inorganic particles in accordance with Example 1.

Below specific embodiments of the present disclosure are further described.

Example 1

A method for preparing organic-pollution-resistant ion exchange resins may include the following operations.

(1) Preparation of an oil phase: mixing a monomer, a crosslinking agent, and an initiator to obtain the oil phase. A weight ratio between the monomer and the crosslinking agent is about 1:0.02 to 0.45, a weight ratio between the monomer and the initiator is about 1:0.003 to 0.15, monomers, initiators, and crisslinking agents are commonly used substances known by those skilled in the art. Examples of the monomer may include methyl acrylate. A weight ratio between the monomer and the crosslinking agent is about 1:0.35. Examples of the crosslinking agent may include divinylbenzene. A weight ratio between the monomer and the initiator is about 1:0.10. Examples of initiator may include benzoyl peroxide.

(2) Preparation of a water phase: adding 0.2 to 3% by weight of a dispersant to the water phase. A weight ratio between the water phase and the oil phase is about 1:0.4 to 1. Dispersant is commonly used substances known by those skilled in the art. The dispersant may include polyvinyl alcohol, which is about 1.5% weight of the water phase. A weight ratio between the water phase and the oil phase is about 1:1.

(3) Modification of inorganic particles: adding inorganic particles to a methanol solution to obtain a mixture, stirring the mixture at 45° C. with 200 rpm for 2 h, adding a modifier to the mixture and stirring the mixture for 5 h, and finally, drying the mixture at 100° C. A weight ratio between the inorganic particles and the methanol solution is about 1:6, a weight ratio between the modifier and the inorganic particles is about 1:2, and the inorganic particles are selected from at least one of kaolin, titanium dioxide, clay, talc, montmorillonite, calcium carbonate, iron, $TiO_2$, $WO_3$, $Fe_3O_4$, $SiO_2$, $ZrO_2$, CuO, $Al_2O_3$, or ZnO, and sizes of the inorganic particles are about 5 to 5000 nm. Inorganic particles and modifiers as well as their combinations are provided in table 1 from A1 to H7.

(4) Addition of the modified inorganic particles: adding the modified inorganic particles to the oil phase. A weight ratio between the monomer of the ion exchange resins and the modified inorganic particles is about 15%.

(5) Suspension Polymerization: adding the oil phase to the stirred water phase, raising the temperature to 75° C. and keeping the temperature for about 8 hours, separating resins from the suspension polymerization system after cooling, and drying the resins after extraction or washing. The stirring speed is about 800 rpm, a temperature is about 65° C., and a duration of polymerization is about 2 hours,

TABLE 1

Types and numbers of inorganic particles and modifiers for preparation of modified inorganic particles

| types and numbers of modified inorganic particle | | Modifier | | | | | |
|---|---|---|---|---|---|---|---|
| | | Silane coupling agent | | Titanate coupling agent | | Hyperdispersant | |
| | | KH550 | KH570 | TMC-TE | TMC-WT | Solsperse-28000 | Solsperse-32500 | Surfactant AEO3 |
| Inorganic particles and dopant | $TiO2$ | A1 | A2 | A3 | A4 | A5 | A6 | A7 |
| | $WO3$ | B1 | B2 | B3 | B4 | B5 | B6 | B7 |
| | $Fe_3O_4$ | C1 | C2 | C3 | C4 | C5 | C6 | C7 |
| | $SiO2$ | D1 | D2 | D3 | D4 | D5 | D6 | D7 |
| | CuO | E1 | E2 | E3 | E4 | E5 | E6 | E7 |
| | $Al2O3$ | F1 | F2 | F3 | F4 | F5 | F6 | F7 |
| | ZnO | G1 | G2 | G3 | G4 | G5 | G6 | G7 |
| | Cerium-doped $TiO_2$ | H1 | H2 | H3 | H4 | H5 | H6 | H7 |

As used herein, KH550—γ-aminopropyl triethoxysilane, KH570—γ-(methacryloxypropyl) trimethoxysilane, TMC-TE—isopropyl tri (dioctyl pyrophosphate acyloxy) titanate, TMC-WT—bis (dioctyl pyrophosphate group) ethylene titanate, Solsperse-28000—Polyester Hyperdispersant (British company ICI Solsperse series), Solsperse-32500—Polyester Hyperdispersant (British company ICI Solsperse series), and AEO3—fatty alcohol ethoxylates.

Wrapped and modified inorganic particles of A2, B2, C2, D2, E2 in table 1 corresponds to ion exchange resins A-A2, A-B2, A-C2, A-D2 and A-E2 respectively.

Using conventional techniques, conventional resins A may be obtained (e.g., steps (1), (2) and (5)).

Table 2 shows physicochemical properties of the series of resins. As shown in Table 2, moisture content of the resins containing inorganic particles increases 3% to 8% as compared to conventional resins, while their resin exchange capacity is not affected.

Resin adsorption IR spectra shows, before and after absorption of the resins, the amount of inorganic pollutants is also significantly reduced. This shows that: addition of inorganic

TABLE 2

Physical and chemical indicators of various strong basic acrylic anion exchange resins containing or without modified inorganic particles

| | | Physical and chemical indicators | | | | |
|---|---|---|---|---|---|---|
| Resins | Framework types | Average Particle size (μm) | Moisture content (%) | Exchange capacity (mmol/g) | Average Aperture (nm) | BET Specific surface area (m2/g) | Microporous Surface (m2/g) |
| Conventional Resins A | Polymethyl acrylate | 250 | 55 | 3.93 | 2.84 | 2.82 | 2.21 |
| A-A2 | $TiO_2$ and polymethyl acrylate | 230 | 63 | 3.92 | 3.16 | 2.61 | 1.07 |
| A-B2 | $WO_3$ and Polymethyl acrylate | 260 | 59 | 3.91 | 3.12 | 2.67 | 1.15 |
| A-C2 | $Fe_3O_4$ and polymethyl acrylate | 220 | 61 | 3.89 | 3.57 | 2.58 | 1.03 |
| A-D2 | $SiO2$ and polymethyl acrylate | 250 | 60 | 3.94 | 3.42 | 2.54 | 1.08 |
| A-E2 | CuO and polymethyl acrylate | 240 | 58 | 3.85 | 3.06 | 2.67 | 1.41 |

The organic-pollution-resistant ion exchange resins describes above may be used to remove humic acid of the biochemical tailwater of municipal wastewater, remove tannic acid in municipal wastewater, remove $UV_{254}$ in municipal wastewater, remove SUVA in municipal wastewater, remove $UV_{254}$ in dyeing wastewater, remove $COD_{Cr}$ in dyeing wastewater, remove TOC in dyeing wastewater, remove DOC in surface water, remove $UV_{254}$ in surface water, remove $UV_{254}$ in drinking water sources, remove $COD_{Cr}$ in food wastewater, remove $COD_{Cr}$ or CN— in coking wastewater, remove $AsO_3^{3-}$ in metallurgical wastewater, remove $Cu^{2+}$ in electroplating wastewater, remove $Zn^{2+}$ in electroplating wastewater or at least one of $Cd^{2+}$, $Pb^{2+}$, $Ni^{2+}$, $Cr^{6+}$, CN— in electroplating wastewater.

FIG. 1 is a relationship chart illustrating removal rates and regeneration times with respect to removal of $COD_{Cr}$ in dyeing wastewater using strong basic acrylic anion exchange resins containing and without inorganic particles in accordance with Example 1. A method for regeneration of the resins include placing resin 0.40 g into 1 L Erlenmeyer flask and mixing with wastewater to be treated, shaking at 20° C. with 130 rpm for 30 min, measuring index of pollutants in the water body after the treatment, and adding the resins 2 ml of 9% NaCl solution and shaking at 20° C. with 130 rpm for 20 min to obtain regenerated resins. The regeneration operation described above was repeated 50 times and the same pollutant index after treatments using two type resins (e.g., conventional and resins prepared using the method described herein) was measure.

As shown in FIG. 1, during the regeneration process of the resins, a trend of removal rates appears more stable in the resins containing the inorganic particles. After regenerated 30 times, a removal rate of the resins containing inorganic particles increases 6% to 12% as compared to that of conventional resins. After regenerated 50 times, the removal rate of the resins containing inorganic particles increases 6% to 13% as compared to that of conventional resins. Comparisons among various types of resins show capability of resistance to pollution increases successively corresponding to adding CuO, $WO_3$, $SiO_2$, $Fe_3O_4$, $TiO_2$ to the resins, which corresponds to moisture content of the resins, respectively.

particles can significantly improve the structure of resins and increase the moisture content if the resins. This further improves pollution resistance ability of the resins and enables the resin to have better removal rates and regeneration stability.

Example 2

The implementations further include a method for preparing organic-pollution-resistant ion exchange resins. Preparation operations are similar to those described in Example 1 except for the following operations and conditions.

(1) Preparation of an oil phase: a weight ratio between the monomer and the crosslinking agent is about 1:0.02, and a weight ratio between the monomer and the initiator is about 1:0.003, (2) Preparation of a water phase: adding 3% by weight of a dispersant to the water phase. A weight ratio between the water phase and the oil phase is about 1:0.8, and the dispersant refers to mixture of polyvinyl alcohol and silicates with mass ratio of 1:1.

(3) Modification of inorganic particles: stirring the mixture at 20° C. with 250 rpm for 4 h, adding a modifier to the mixture and stirring the mixture for 0.5 h, and finally, drying the mixture. A weight ratio between the inorganic particles and the methanol solution is about 1:10. A weight ratio between the modifier and the inorganic particles is about 1:5.

(4) Addition of the modified inorganic particles: adding the modified inorganic particles to the water phase. A weight ratio between the monomer of the ion exchange resins and the modified inorganic particles is about 30%. $Fe_3O_4$ modified by C1, C3, C5, C7, and oleic acid in Table 1 are used in this Example.

(5) Suspension Polymerization: adding the oil phase to the stirred water phase, raising the temperature to 85° C. and keeping the temperature for about 1 hours, separating resins from the suspension polymerization system after cooling, and drying the resins after extraction or washing to obtain novel resins A-C1, A-C3, A-C5, A-C7, A-C-oleic acid. The stirring speed is about 1500 rpm, a temperature is about 50°

C., and a duration of polymerization is about 5 hours. Corresponding conventional resins may be obtained using steps (1), (2), and (5).

Table 3 shows physicochemical properties of these series of resins. As shown in Table 3, moisture content of the resins containing modified $Fe_3O_4$ increases as compared to conventional resins. Except for oleic acid (1%), moisture content of the resins using other modifiers increases 3% to 8%.

TABLE 3

Physical and chemical indicators of various strong basic acrylic anion exchange resins containing $Fe_3O_4$ modified by various modifiers.

| | | Physical and chemical indicators | | | | | |
|---|---|---|---|---|---|---|---|
| Resins | Modifier types | Average Particle size (μm) | Moisture content (%) | Exchange capacity (mmol/g) | Average Aperture (nm) | BET Specific surface area (m2/g) | Microporous Surface (m2/g) |
| Conventional Resins A | no | 250 | 55 | 3.93 | 2.84 | 2.82 | 2.21 |
| A-C1 | KH550 modification $Fe_3O_4$ | 220 | 61 | 3.91 | 3.25 | 2.92 | 1.31 |
| A-C3 | TMC-TE Modification $Fe_3O_4$ | 230 | 58 | 3.78 | 3.06 | 2.68 | 1.06 |
| A-C5 | Solsperse-28000 Modified $Fe_3O_4$ | 240 | 62 | 3.87 | 4.12 | 2.84 | 1.64 |
| A-C7 | AEO3 modification $Fe_3O_4$ | 260 | 61 | 3.79 | 3.24 | 2.21 | 1.23 |
| AC- oleic acid | $Fe_3O_4$ modified by oleic acid | 240 | 56 | 3.92 | 3.23 | 2.27 | 1.34 |

Figure 2:
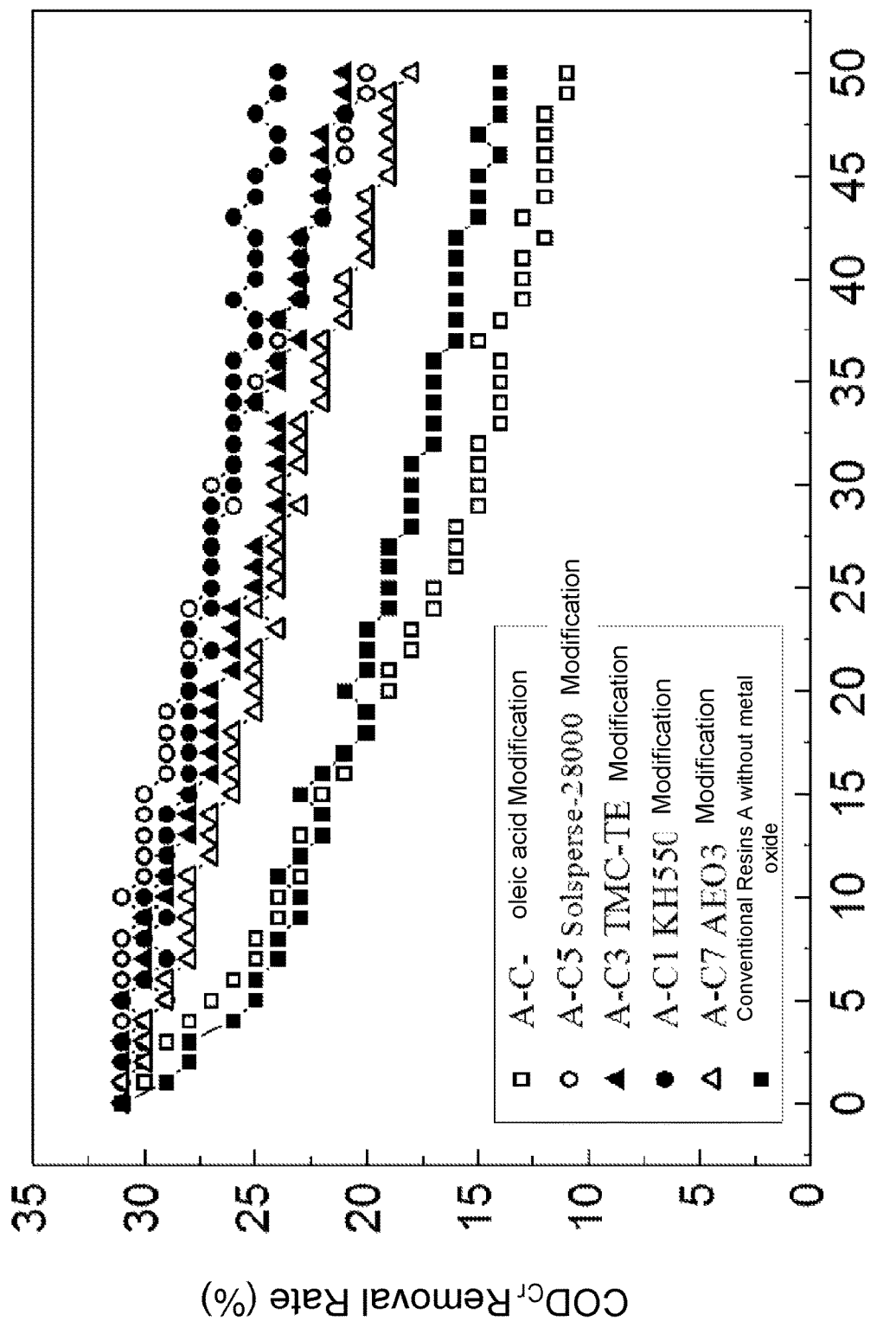
FIG. 2 is a relationship chart illustrating removal rates and regeneration times with respect to removal of $COD_{Cr}$ in dyeing wastewater using strong basic acrylic anion exchange resins containing inorganic particles modified by various type of modifiers with respect to $Fe_3O_4$ in accordance with Example 2.

The resins containing or without modified $Fe_3O_4$ are used to treat dyeing wastewater. The resins were regenerated using the method described in Example 1. FIG. 2 is a relationship chart illustrating removal rates and regeneration times with respect to removal of substances in dyeing wastewater using strong basic acrylic anion exchange resins containing inorganic particles modified by various type of modifiers with respect to $Fe_3O_4$ in accordance with Example 2.

Based on removal rates of $COD_{Cr}$ in the dyeing wastewater, during the regeneration of the resins, four modifiers KH550, TMC-TE, Solsperse-28000, AEO3 were used to modify and wrap $Fe_3O_4$ to improve hydrophilicity of the resin and resistance to pollution as compared to conventional resins. After regenerated 30 times, a removal rate of the resins containing $Fe_3O_4$ increases 6% to 9% as compared to that of conventional resins. After regenerated 50 times, the removal rate of the resins containing $Fe_3O_4$ increases 4% to 10% as compared to that of conventional resins. Novel resin containing $Fe_3O_4$ modified by KH550 has the best pollution resistance, and the overall trend of these resins is relatively stable. Moisture contents of Solsperse-28000, AEO3 modified resins are higher, but their pore structure easily adsorbs organic matters and their pollution performance declines. However, resins containing $Fe_3O_4$ modified by oleic acid increase pollutions and decease removal rate of 3%. It may be due to an increase in carboxyl groups, and exclusion pollutants. Also, combination of hydrophobic organics accelerates resin contamination. This analysis and infrared spectra showing small pollutants of organic molecules in the resins gradually increase are consistent. This shows: suitable resin modifiers are to optimize the structure of the resins and improve moisture content. Oleic acid may not be an ideal modifier for modifying inorganic particles to improve pollution resistance.

Example 3

The implementations further include a method for preparing organic-pollution-resistant ion exchange resins. Preparation operations are similar to those described in Example 1 except for the following operations and conditions.

(1) Preparation of an oil phase: a weight ratio between the monomer and the crosslinking agent is about 1:0.45, and a weight ratio between the monomer and the initiator is about 1:0.15.

(2) Preparation of a water phase: adding 0.2% by weight of a dispersant to the water phase. A weight ratio between the water phase and the oil phase is about 1:0.4, and the dispersant refers to mixture of polyvinyl alcohol and silicates with mass ratio of 1:1.

(3) Modification of inorganic particles: stirring the mixture at 20° C. with 250 rpm for 4 h, adding a modifier to the mixture and stirring the mixture for 0.5 h, and drying the mixture. A weight ratio between the inorganic particles and the methanol solution is about 1:3 to 10, and a weight ratio between the modifier and the inorganic particles is about 1:0.05 to 5.

(4) Addition of the modified inorganic particles: adding the modified $Fe_3O_4$ modified by KH550 to the water phase. Weight ratios between the oil phase and the KH550 is about 1%, 6%, 10%, 15%, 20%, respectively. Data related to KH550 is shown in table 1.

(5) Suspension Polymerization: adding the oil phase to the stirred water phase, raising the temperature to 85° C. and keeping the temperature for about 1 hours, separating resins from the suspension polymerization system after cooling, and drying the resins after extraction or washing to obtain novel resins A-C1-1, A-C1-6, A-C1-10, A-C1-15, A-C1-20. The stirring speed is about 1500 rpm, a temperature is about 50° C., and a duration of polymerization is about 2 hours.

Using conventional techniques, conventional resins A may be obtained (e.g., steps (1), (2) and (5)).

$Fe_3O_4$ modified by versions amounts of KH550 were added to prepare a serial of resins. After paragraph burn of the resins at 500 degrees, weights of residues of the resins were analyzed to measure mineral contents.

Physicochemical properties of the resins are shown in Table 4.

As shown in Table 4, moisture content of the resins containing modified $Fe_3O_4$ increases 3% to 9% as compared to conventional resins for the same exchange capacity.

The weights of residues were consistent the amount of added $Fe_3O_4$ to the resins.

TABLE 4

Physical and chemical indicators of various strong basic acrylic anion exchange resins containing $Fe_3O_4$ modified by various amounts of KH550.

| Resins | $Fe_3O_4$ Weight (G/100 g oil phase) | Average particle diameter (μm) | Moisture content (%) | Exchange capacity (mmol/g) | Average pore diameter (nm) | BET Specific surface area (m2/g) | Residue mass (g) |
|---|---|---|---|---|---|---|---|
| Conventional Resins A | no | 250 | 55 | 3.93 | 2.84 | 2.82 | 0 |
| A-C1-1 | 1 | 240 | 58 | 3.92 | 3.04 | 2.75 | 0.999 |
| A-C1-6 | 6 | 230 | 64 | 3.89 | 4.52 | 2.85 | 5.997 |
| A-C1-10 | 10 | 240 | 63 | 3.90 | 4.11 | 2.64 | 9.988 |
| A-C1-15 | 15 | 220 | 62 | 3.91 | 3.25 | 2.92 | 14.485 |
| A-C1-20 | 20 | 200 | 62 | 3.90 | 3.27 | 3.54 | 19.345 |

Figure 3:
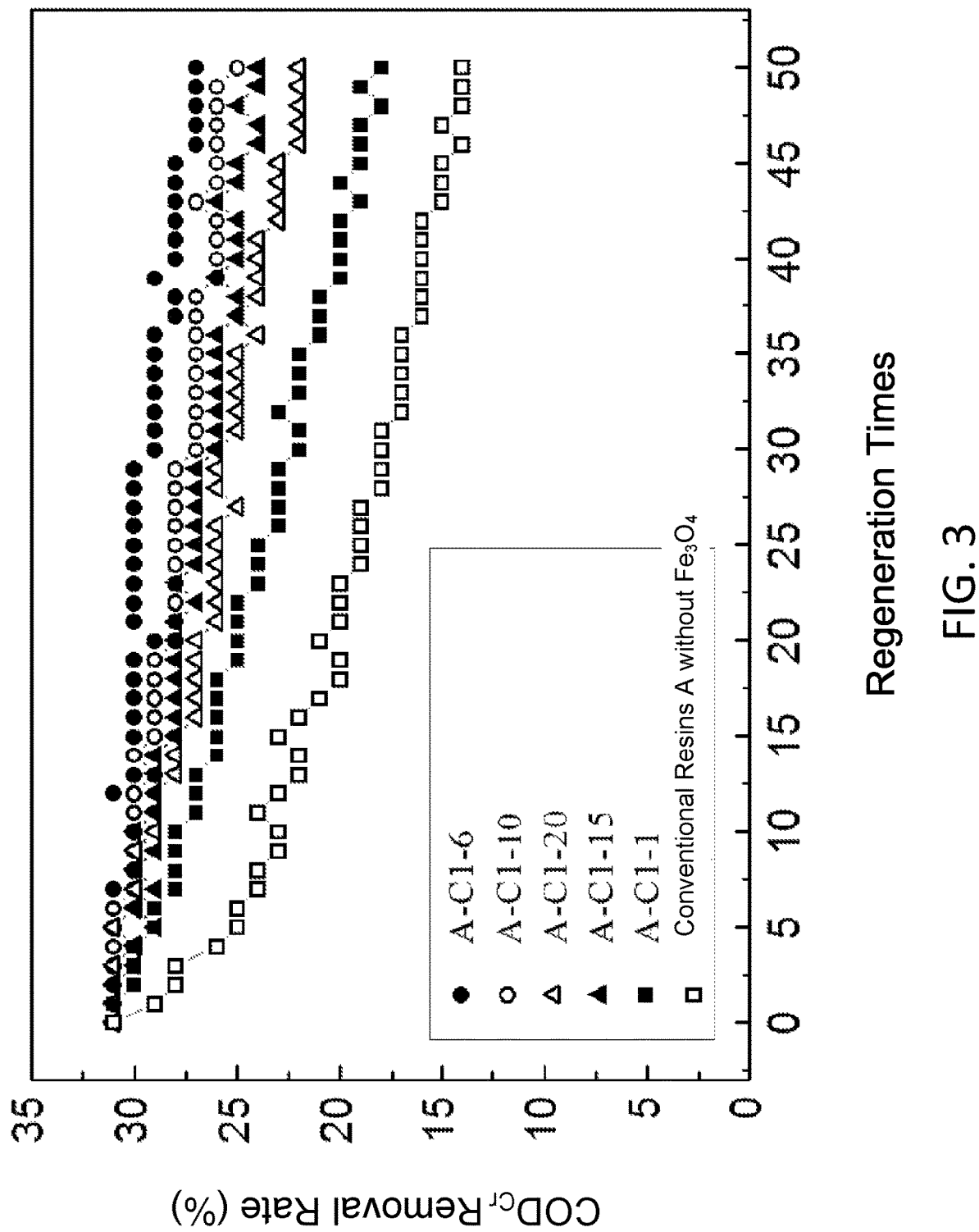
FIG. 3 is a relationship chart illustrating removal rates and regeneration times with respect to removal of $COD_{Cr}$ in dyeing wastewater using strong basic acrylic anion exchange resins containing inorganic particles modified by various weights of KH550 with respect to $Fe_3O_4$ in accordance with Example 3.

The resins containing $Fe_3O_4$ before and after modification are used to treat dyeing wastewater. The resins were regenerated using the method described in Example 1. Comparisons of various strong basic acrylic anion exchange resins containing $Fe_3O_4$ modified by various amounts of KH550 with respect to removal ratios after regeneration have been shown in FIG. 3.

Based on removal rates of $COD_{Cr}$ in the dyeing wastewater, during the regeneration of the resins, weights of 1%, 6%, 10%, 15%, 20% KH550 were used to modify $Fe_3O_4$ to improve hydrophilicity of the resin and resistance to pollutions as compared to conventional resins. After regenerated 30 times, a removal rate of the resins containing $Fe_3O_4$ increases 4% to 11% as compared to that of conventional resins. After regenerated 50 times, the removal rate of the resins containing inorganic particles increases 4% to 13% as compared to that of conventional resins. Novel resin containing $Fe_3O_4$ modified by 6 g of KH550 has the best pollution resistance, and the overall trend of these resins is relatively stable. With gradually increase of the amount of $Fe_3O_4$, pollution-resistance decreases slightly. This shows that: addition of excess $Fe_3O_4$ has impact on resin matrix, produces more narrow channels, absorb more organic matters, and has a certain repulsion on the target matters. In addition, only 1% of $Fe_3O_4$ can enhance pollution-resistance capability of the resin. Further experiments showed that adding modified inorganic particles with the weight of 0.1% of the monomer to resins can also be effective against organic pollution; but the effect is not obvious.

Example 4

The implementations further include a method for preparing organic-pollution-resistant ion exchange resins. Preparation operations are similar to those described in Example 1 except for the following operations and conditions. Preparation operations are similar to those described in Example 1 except for the following operations and conditions.

(1) Preparation of an oil phase: the monomer includes Styrene and divinylbenzene, a weight ratio between an amount of Styrene and an amount of divinylbenzene is about 5:76, examples of initiator may include formylamino, and a weight ratio between the monomer and the initiator is about 1:0.15.

(2) Preparation of a water phase: adding 0.2% by weight of a dispersant to the water phase. The dispersant includes salt and gelatin with a weight ratio being 1:1, and a weight ratio between the water phase and the oil phase is about 1:0.4.

(3) Modification of inorganic particles: adding inorganic particles to a methanol solution to obtain a mixture, stirring the mixture at 40° C. with 240 rpm for 0.5 h, adding a modifier to the mixture and stirring the mixture for 6 h, and finally, drying the mixture at 100° C. A weight ratio between the inorganic particles and the methanol solution is about 1:6, and a weight ratio between the modifier and the inorganic particles is about 1:2.

(4) Addition of the modified inorganic particles: adding the modified inorganic particles to the oil phase. A weight ratio between the monomer of the ion exchange resins and the modified inorganic particles is about 8%, and the monomer is A4, D4, F4, G4, H4 (See modification in Table 1) to obtain novel resins B-A4, B-D4, B-F4, B-G4, B-H4. Conventional resins B containing no inorganic particles was used here as comparison.

Physicochemical properties of the resins are shown in Table 5. As shown in Table 5, moisture content of the resins containing inorganic particles increases 7% to 11% as compared to conventional resins for the same exchange capacity.

TABLE 5

Physical and chemical indicators of various strong basic acrylic anion exchange resins before and after modification by various inorganic particles

| Resins | Framework types | Average Particle (μm) | Moisture content (%) | Exchange (mmol/g) | Average Aperture (nm) | BET Specific (m2/g) | Microporous (m2/g) |
|---|---|---|---|---|---|---|---|
| Conventional resins B | Poly-divinylbenzene | 200 | 46 | 3.65 | 5.95 | 2.04 | 0.86 |
| B-A4 | $TiO_2$ and poly-divinylbenzene | 200 | 57 | 3.62 | 3.64 | 2.32 | 1.24 |
| B-D4 | SiO2 and poly-divinylbenzene | 190 | 54 | 3.59 | 3.58 | 2.59 | 1.18 |
| B-F4 | Al2O3 and poly-divinylbenzene | 200 | 56 | 3.63 | 3.74 | 2.71 | 1.17 |
| B-G4 | ZnO and poly-divinylbenzene | 210 | 53 | 3.64 | 3.87 | 2.21 | 1.09 |
| B-H4 | Cerium-doped TiO2 and poly-divinylbenzene | 220 | 56 | 3.65 | 3.56 | 2.07 | 1.11 |

The resins before and after modification are used to treat municipal wastewater secondary effluent. Resins may be regenerated using the following operations, and the following operations may be performed: placing resin 0.40 g into 1 L Erlenmeyer flask and mixing with 500 ml wastewater to be treated, shaking at 20° C. with 130 rpm for 30 min, measuring index of pollutants in the water body after the treatment, and adding the resins 2 ml of 4% HCl and 2 ml 4% NaOH solutions and shaking at 20° C. with 130 rpm for 20 min to obtain regenerated resins. The regeneration operation described above was repeated 50 times and the same pollutant index after treatments using two type resins (e.g., conventional and resins prepared using the method described herein) was measure.

Figure 4:
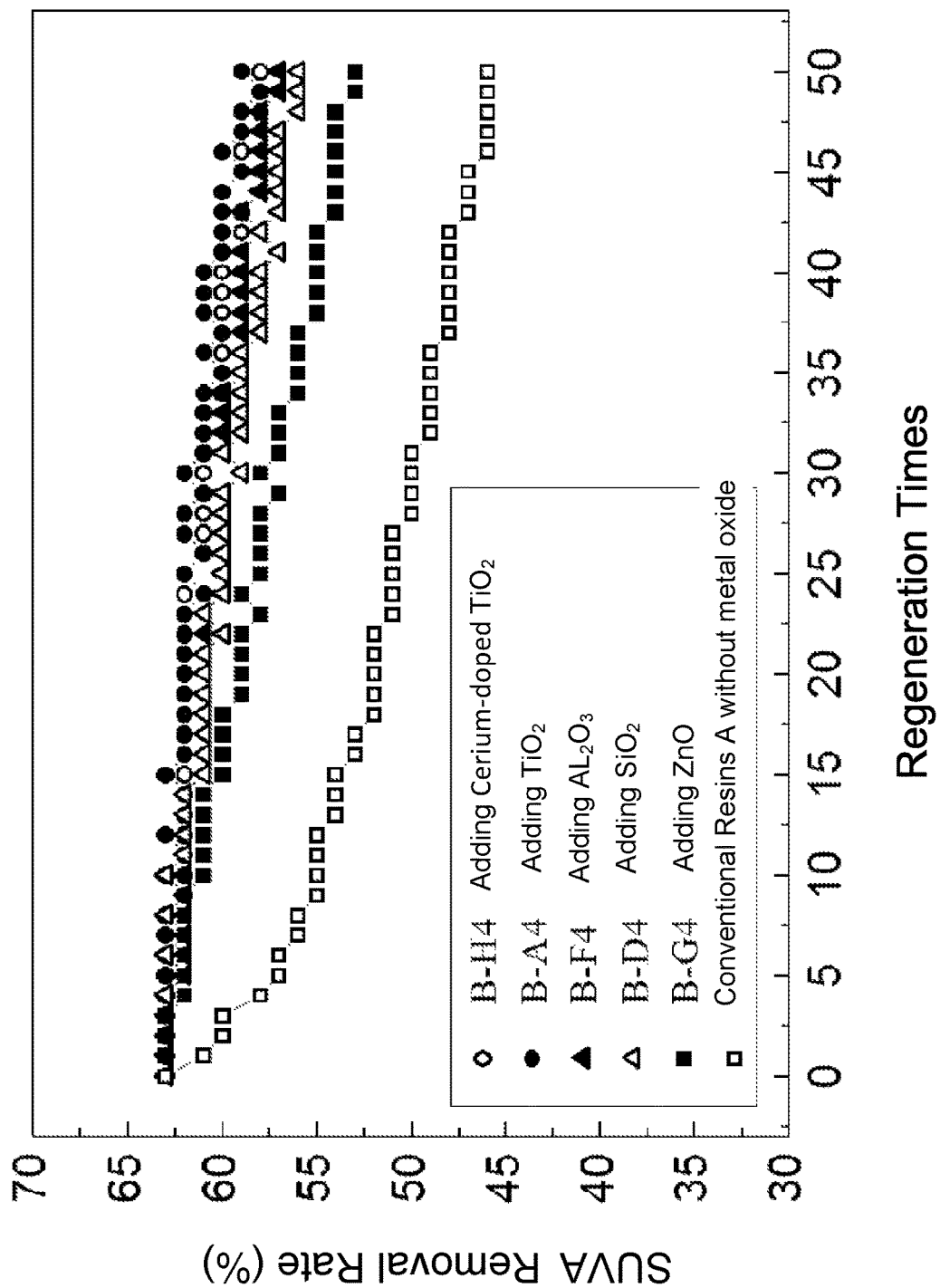
FIG. 4 is a relationship chart illustrating removal rates and regeneration times with respect to removal of SUVA in municipal wastewater secondary effluent using strong alkaline styrene anion exchange resins containing and without inorganic particles in accordance with Example 4.

Comparisons among various strong basic acrylic anion exchange resins containing various inorganic particles with respect to removal ratios after regeneration have been shown in FIG. 4.

Based on removal rates of SUVA in the dyeing wastewater, during the regeneration of the resins, a trend of removal rates of SUVA appears more stable in the resins containing the inorganic particles. After regenerated 30 times, a removal rate of the resins containing inorganic particles increases 8% to 12% as compared to that of conventional resins. After regenerated 50 times, the removal rate of the resins containing inorganic particles increases 7% to 13% as compared to that of conventional resins. Comparisons among various types of resins show capability of resistance to pollution increases successively corresponding to adding ZnO, $SiO_2$, $Al_2O_3$, Cerium-doped, $TiO_2$, and $TiO_2$ to the resins, which corresponds to moisture content of the resins, respectively. Resin adsorption IR spectra shows, before and after absorption of the resins, the amount of inorganic pollutants is also significantly reduced.

Example 5

Operating conditions of Example 5 is similar to those of Example 4. 15% weight of modifiers including KH570, TMC-TE, Solsperse-32500, AEO3, $TiO_2$ modified by oleic acid (See Table 1) was added to the oil phase, respectively to obtain novel resins B-A2, B-A3, B-A6, B-A7, BA-oleic acid. Other steps are the same.

Physicochemical properties of the resins are shown in Table 6. As shown in Table 6, moisture content of the resins containing $TiO_2$ increases 4% to 13% as compared to conventional resins for the same exchange capacity.

TABLE 6

Physical and chemical indicators of various strong basic acrylic anion exchange resins containing $TiO_2$ modified by various modifiers.

| Resins | Modifier types | Average Particle size (μm) | Moisture content (%) | Exchange capacity (mmol/g) | Average Aperture (nm) | BET Specific surface area (m2/g) | Microporous Surface (m2/g) |
|---|---|---|---|---|---|---|---|
| Conventional resins B | no | 200 | 46 | 3.65 | 5.95 | 2.04 | 0.86 |
| B-A2 | KH570 modification | 220 | 58 | 3.61 | 3.87 | 2.42 | 1.31 |
| B-A3 | TMC-TE modification TiO2 | 210 | 55 | 3.68 | 3.74 | 2.34 | 1.26 |
| B-A6 | Solsperse-325 00 modification TiO2 | 180 | 59 | 3.64 | 3.41 | 3.95 | 2.21 |
| B-A7 | AEO3 modification TiO2 | 190 | 57 | 3.60 | 3.34 | 2.59 | 1.54 |

TABLE 6-continued

Physical and chemical indicators of various strong basic acrylic anion exchange resins containing $TiO_2$ modified by various modifiers.

| | | Physical and chemical indicators | | | | | |
|---|---|---|---|---|---|---|---|
| Resins | Modifier types | Average Particle size (μm) | Moisture content (%) | Exchange capacity (mmol/g) | Average Aperture (nm) | BET Specific surface area (m2/g) | Microporous Surface (m2/g) |
| BA- oleic acid | Oleic acid modification TiO2 | 200 | 50 | 3.66 | 3.52 | 2.01 | 1.07 |

Figure 5:
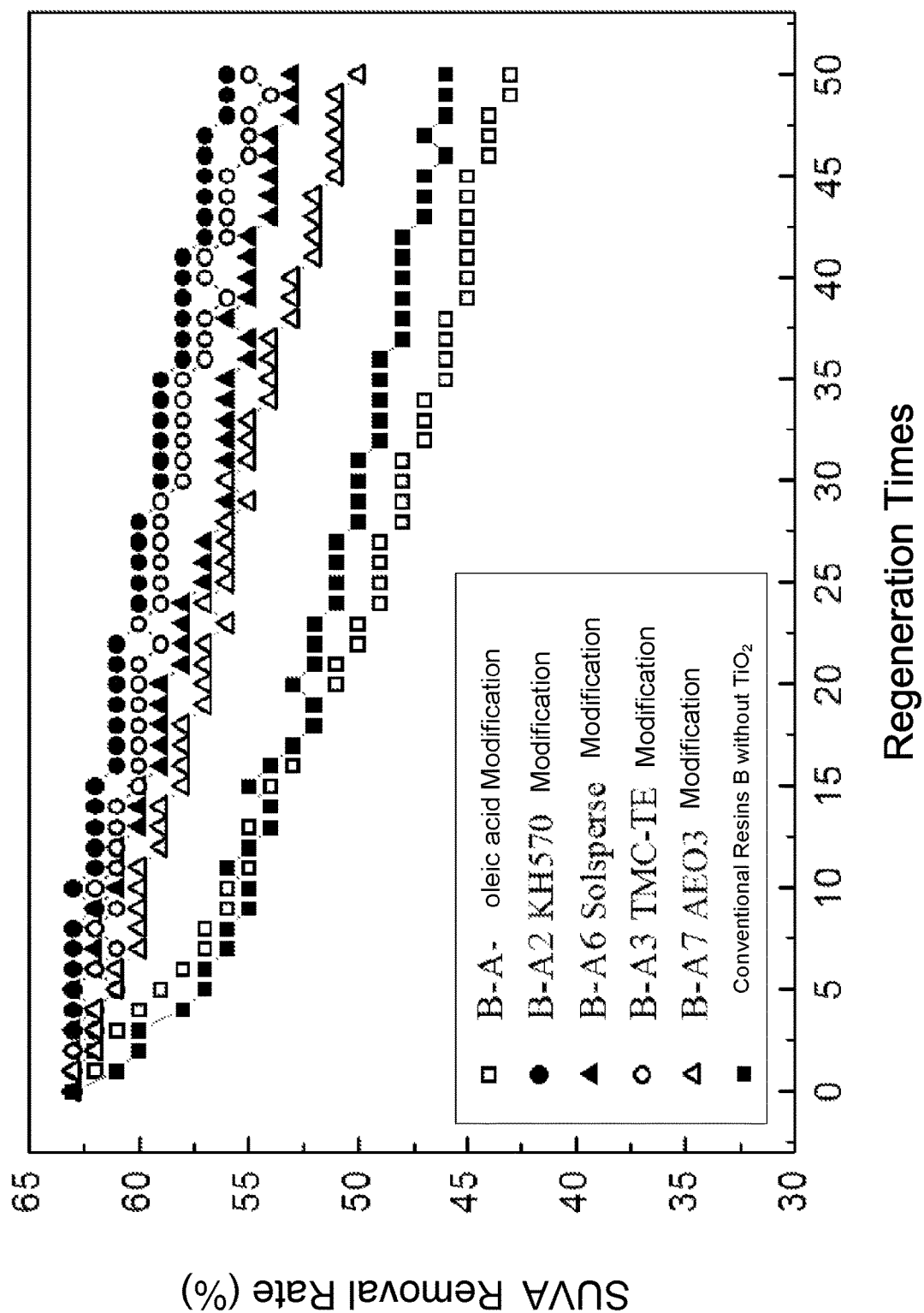
FIG. 5 is a relationship chart illustrating removal rates and regeneration times with respect to removal of SUVA in municipal wastewater secondary effluent using strong alkaline styrene anion exchange resins containing inorganic particles modified by various modifiers with respect to $TiO_2$ in accordance with Example 5.

The resins before and after modification using $TiO_2$ are used to treat municipal wastewater secondary effluent. The resins were regenerated using the method described in Example 4. Comparisons among various strong basic acrylic anion exchange resins containing various $TiO_2$ with respect to removal ratios after regeneration have been shown in FIG. 5.

Based on removal rates of SUVA in the dyeing wastewater, during the regeneration of the resins, four modifiers KH570 present method used, TMC-TE, Solsperse-32500 and AEO3 effectively wrapped $TiO_2$, which improves hydrophilicity of the resins and resistance to pollution as compared to conventional resins. After regenerated 30 times, a removal rate of the resins containing $TiO_2$ increases 6% to 9% as compared to that of conventional resins. After regenerated 50 times, the removal rate of the resins containing $TiO_2$ increases 4% to 10% as compared to that of conventional resins. Novel resin containing $TiO_2$ modified by KH550 has the best pollution resistance, and the overall trend of these resins is relatively stable. Moisture content of the resins containing $TiO_2$ modified by Solsperse-32500, and AEO3 is higher, but their pore structures more easily adsorb organic matters and their pollution performance is lower, as compared to the resins containing $TiO_2$ modified by AEO3. Pollution resistance of these resins are better than the conventional resins B. However, resins containing $TiO_2$ modified by oleic acid increase pollution of these resins and decease their removal rate of 2%. Possibly, addition of carboxyl results in pollutants exclusion, and binding with more hydrophobic organics accelerates resin contamination. This analysis and infrared spectra showing small pollutants of organic molecules in the resins gradually increase are consistent.

Example 6

The implementations further include a method for preparing permanent magnet alkali epoxy organic-pollution-resistant ion exchange resins. Preparation operations are similar to those described in Example 1 except for the following operations and conditions.

(1) Preparation of an oil phase: adding 40% weight of $Fe_2O_3$ to the crosslinking agent. A weight ratio between the monomer and the crosslinking agent is about 1:0.02, a weight ratio between the monomer and the initiator is about 1:0.003, and examples of the monomer may include glycidyl methacrylate, (2) Addition of the modified inorganic particles: adding the modified inorganic particles to the water phase. A weight ratio between the monomer of the ion exchange resins and the modified inorganic particles is about 30%. The inorganic particles used in Example 6 are B1, C1, D1, F1, H1 as shown in table 1.

(5) Suspension Polymerization: adding the oil phase to the stirred water phase, raising the temperature to 85° C. and keeping the temperature for about 1 hours, separating resins from the suspension polymerization system after cooling, and drying the resins after extraction or washing to obtain novel resins C-B1, C-C1, C-D1, C-F1, C-H1. The stirring speed is about 1500 rpm, a temperature is about 50° C., and a duration of polymerization is about 5 hours.

Using conventional techniques, conventional resins C may be obtained (e.g., steps (1), (2) and (5)).

Physicochemical properties of the resins are shown in Table 7. As shown in Table 7, moisture content of the resins containing inorganic particles increases 3% to 4% as compared to conventional resins for the same exchange capacity.

TABLE 7

Physical and chemical indicators of various permanent magnet alkali epoxy ion exchange resins before and after modification by various inorganic particles

| | | Physical and chemical indicators | | | | | |
|---|---|---|---|---|---|---|---|
| Resins | Framework types | Average Particle size (μm) | Moisture content (%) | Exchange capacity (mmol/g) | Average Aperture (nm) | BET Specific surface area (m2/g) | Microporous Surface (m2/g) |
| Conventional Resins C | Glycidyl methacrylate | 180 | 62 | 2.53 | 5.65 | 21.76 | 3.12 |
| C-B1 | WO3 and Glycidyl methacrylate | 200 | 65 | 2.52 | 3.85 | 6.92 | 1.61 |
| C-C1 | $Fe_3O_4$ and glycidyl methacrylate | 190 | 66 | 2.50 | 3.56 | 6.59 | 1.43 |
| C-D1 | SiO2 and glycidyl methacrylate | 180 | 65 | 2.47 | 3.74 | 7.17 | 1.94 |

TABLE 7-continued

Physical and chemical indicators of various permanent magnet alkali epoxy ion exchange resins before and after modification by various inorganic particles

| Resins | Framework types | Average Particle size (μm) | Moisture content (%) | Exchange capacity (mmol/g) | Average Aperture (nm) | BET Specific surface area (m2/g) | Microporous Surface (m2/g) |
|---|---|---|---|---|---|---|---|
| C-F1 | Al2O3 and glycidyl methacrylate | 210 | 65 | 2.45 | 3.59 | 7.01 | 1.85 |
| C-H1 | Cerium-doped TiO2 and glycidyl methacrylate | 220 | 64 | 2.51 | 3.62 | 6.86 | 1.64 |

Figure 6:
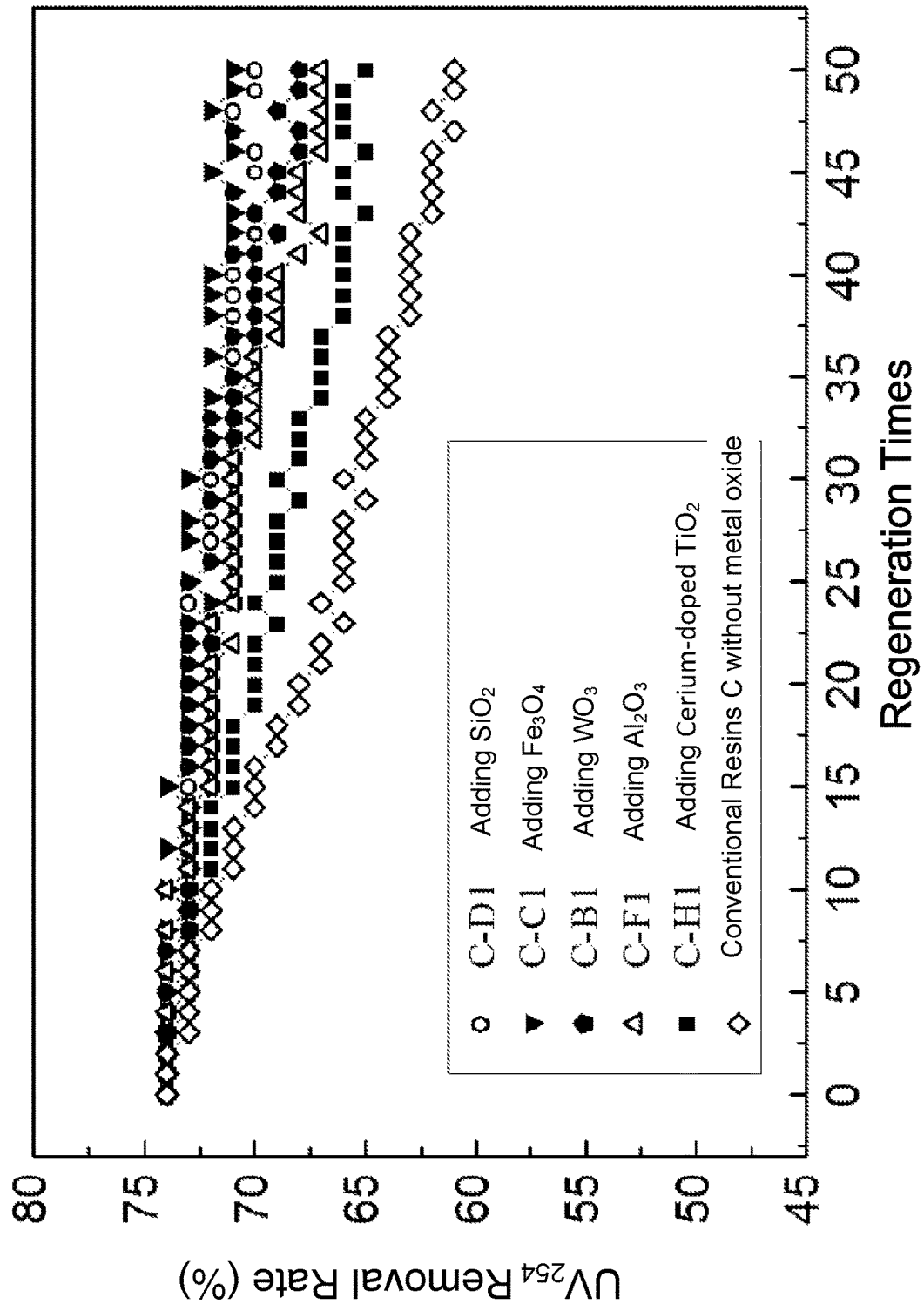
FIG. 6 is a relationship chart illustrating removal rates and regeneration times with respect to removal of $UV_{254}$ in source of drinking water using permanent magnet strong basic anion epoxy ion exchange resins containing and without inorganic particles in accordance with Example 6.
Figure 7:
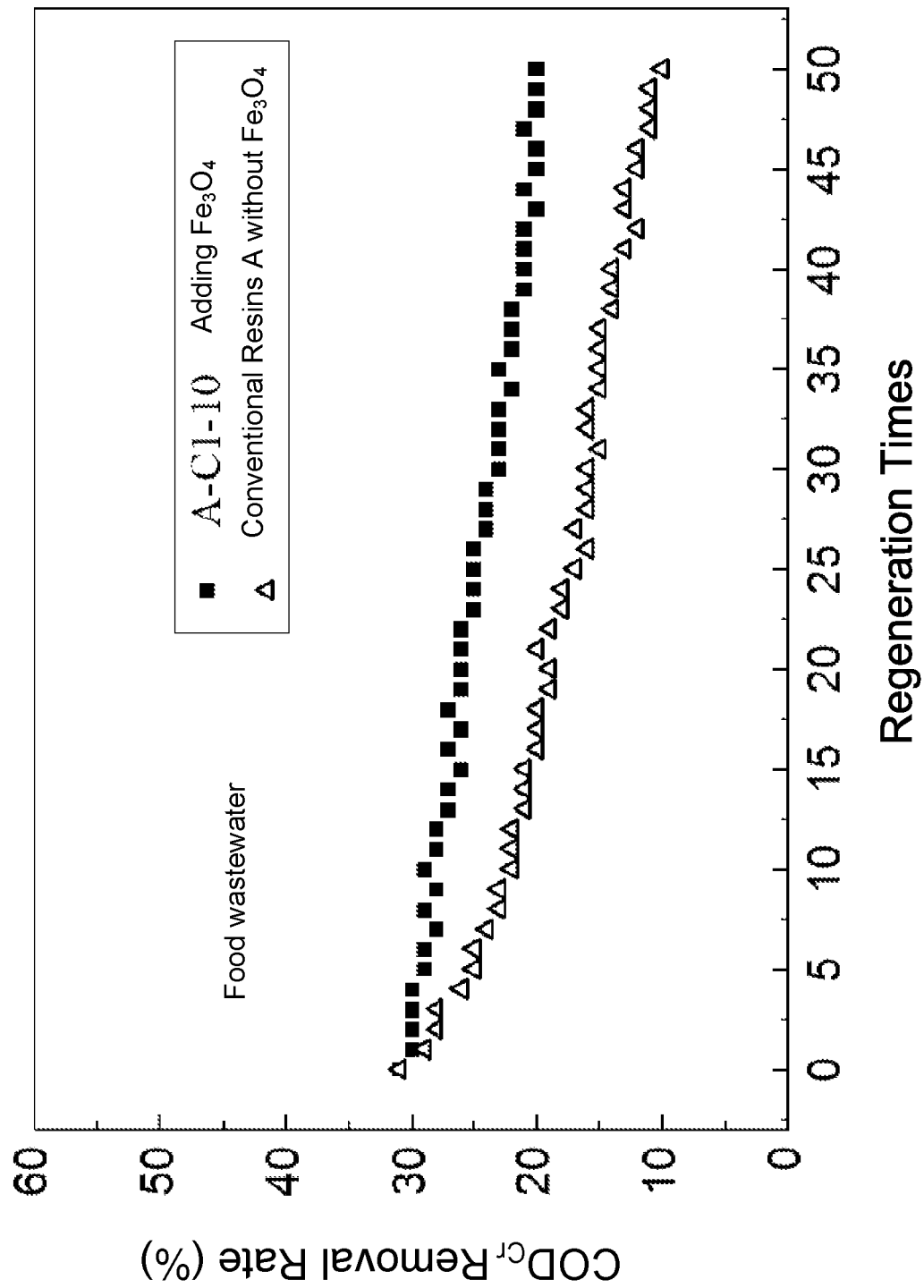
FIG. 7 is a relationship chart illustrating removal rates and regeneration times with respect to removal of $COD_{Cr}$ in food wastewater using strong basic acrylic anion exchange resins containing inorganic particles including modification of $Fe_3O_4$ in accordance with Example 7.
Figure 8:
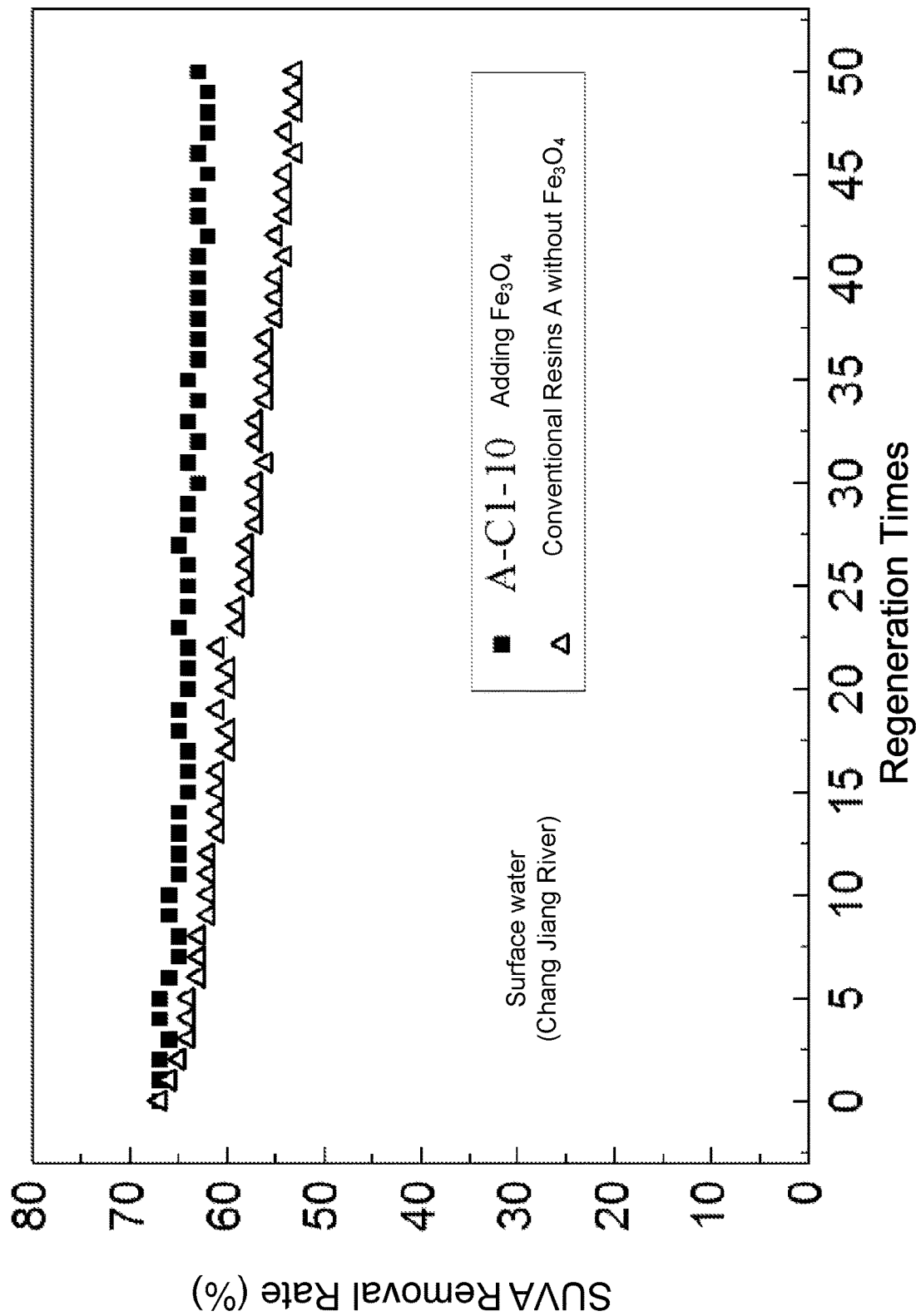
FIG. 8 is a relationship chart illustrating removal rates and regeneration times with respect to removal of SUVA in surface waste using strong basic acrylic anion exchange resins containing inorganic particles including modification of $Fe_3O_4$ in accordance with Example 7.
Figure 9:
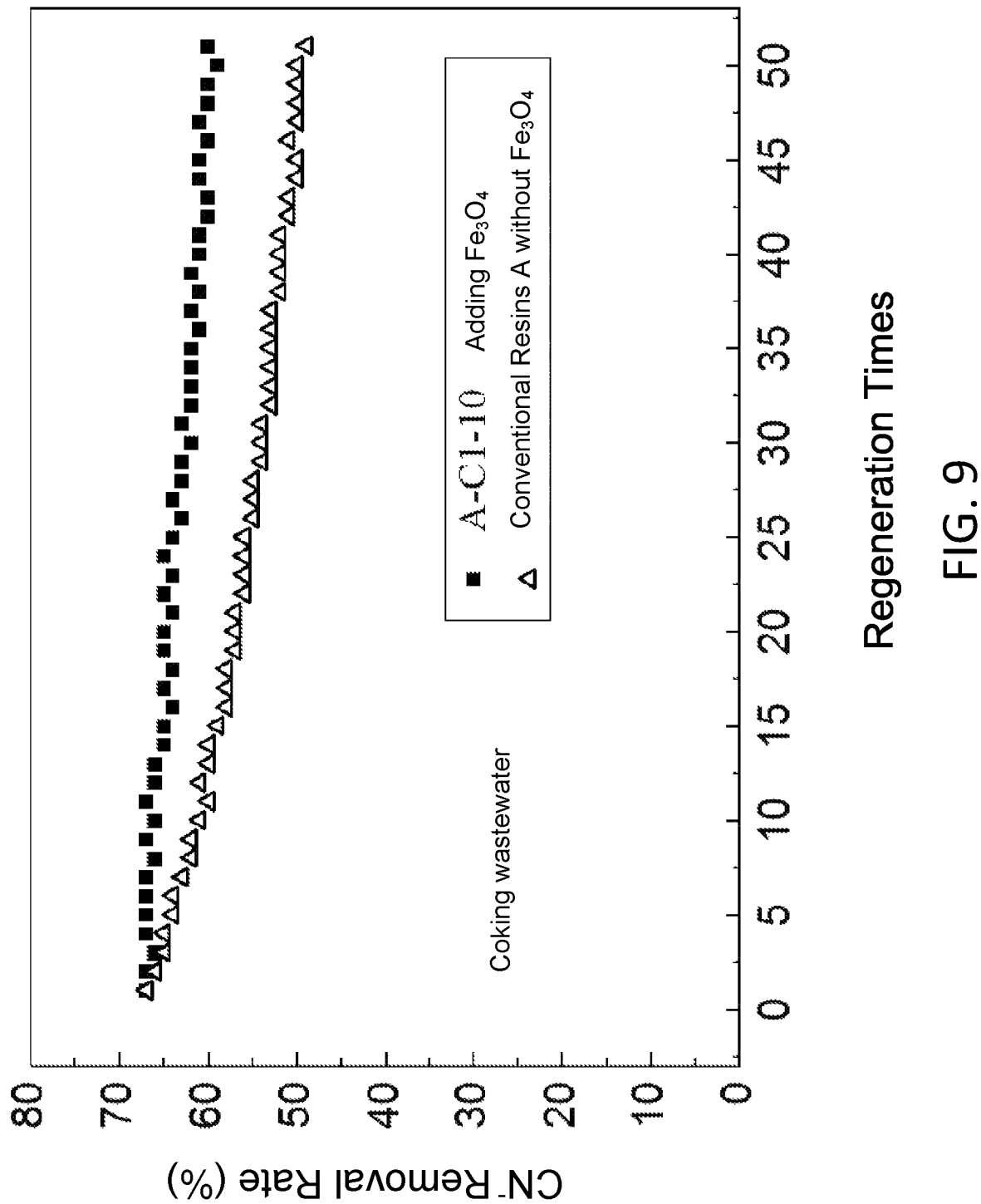
FIG. 9 is a relationship chart illustrating removal rates and regeneration times with respect to removal of CN— in coking wastewater using strong basic acrylic anion exchange resins containing inorganic particles including modification of $Fe_3O_4$ in accordance with Example 7.
Figure 10:
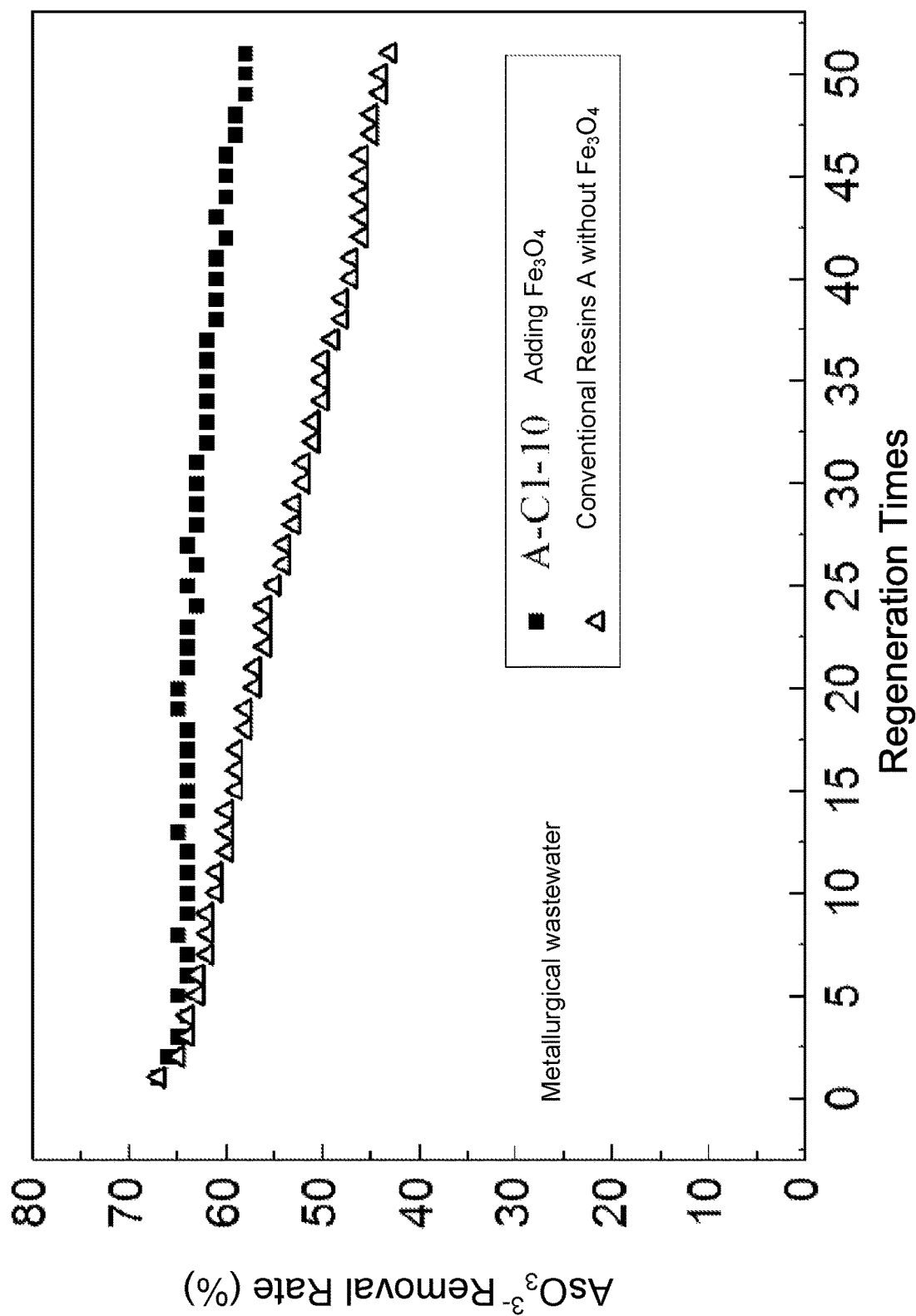
FIG. 10 is a relationship chart illustrating removal rates and regeneration times with respect to removal of $AsO_3^{3-}$ in metallurgical wastewater using strong basic acrylic anion exchange resins containing inorganic particles including modification of $Fe_3O_4$ in accordance with Example 7.

The resins before and after modification are used to treat drinking water sources. The resins were regenerated using the method described in Example 1. Comparisons among various permanent magnet alkali epoxy ion exchange resins containing various inorganic particles with respect to removal ratios after regeneration have been shown in FIG. 6.

Based on removal rates of $UV_{254}$ the drinking water sources, during the regeneration of the resins, a trend of removal rates of $UV_{254}$ appears more stable in the resins containing the inorganic particles. After regenerated 30 times, a removal rate of the resins containing inorganic particles increases 3% to 7% as compared to that of conventional resins. After regenerated 50 times, the removal rate of the resins containing inorganic particles increases 7% to 13% as compared to that of conventional resins. Adding $Fe_2O_3$ to the resin along, pollution-resistance of the resins is not good. Comparisons among various types of resins show capability of resistance to pollution increases successively corresponding to adding $SiO_2$, $Al_2O_3$, $WO_3$, cerium-doped $TiO_2$, $Fe_3O_4$ to the resins, which corresponds to moisture content of the resins, respectively. Resin adsorption IR spectra shows, before and after absorption of the resins, the amounts of inorganic pollutants are consistent. Thus, addition of inorganic particles wrapped by modifiers help to improve moisture content of resins, mitigate organic pollution processes, and improve efficiency and service life of the resins.

Example 7

Based on Example 3, strong basic acrylic anion exchange resins (conventional resin A) were prepared. Adding 10 g $Fe_3O_4$ modified by KH550 to obtain novel resins A-C1-10. This series resins were used to treat food wastewater, surface water (Yangtze river), coking wastewater, and metallurgical wastewater. Their regenerative properties are shown in FIGS. 7, 8, 9, and 10.

After modified by $Fe_3O_4$, pollution-resistance capability of the strong basic acrylic anion exchange resins increases during the treatment of food wastewater, surface water (Yangtze river), coking wastewater, and metallurgical wastewater. Regeneration efficiency of the ion exchange resins containing the inorganic particles after removing of $COD_{Cr}$ in the food wastewater increases 1% to 28%, regeneration efficiency of the ion exchange resins containing the inorganic particles after removing $COD_{Cr}$ 或 $CN^-$ in the coking wastewater increases 1% to 55%, regeneration efficiency of the ion exchange resins containing the inorganic particles after removing $AsO_3^{3-}$ in the metallurgical wastewater increases 1% to 55%, regeneration efficiency of the ion exchange resins containing the inorganic particles after removing DOC in the surface water increases 0.5% to 45%, regeneration efficiency of the ion exchange resins containing the inorganic particles after removing $UV_{254}$ in the surface water increases 1% to 40%. After regenerated 30 times, a removal rate of the resins containing $Fe_3O_4$ increases about 6% as compared to that of conventional resins. Organic matters in food wastewater are complex and have too many types. With a wide molecular weight distribution, these organic matters have a larger proportion of hydrophobic organic compounds. Although the performance of novel resins is affected, it is still more stable and effective than the performance of conventional resins. In summary, the addition of inorganic particles can improve the structure of the resin, and improve their pollution resistance in treating various water samples.

Example 8

The implementations further include a method for preparing organic-pollution-resistant chitosan cation exchange resins. The method may include the following operations.

(1) Preparation of modified and wrapped inorganic particles is similar to those described in steps (3) and (4) of Example 1. The modifier includes TMC-WT 1 and Solsperse-28000 with a weight ratio 1:1. The inorganic particles includes $SiO_2$.

(2) Preparation of conventional chitosan cation exchange resins: at 60° C., adding 50 g of water-soluble chitosan to 700 ml water solution containing 80 g Tween and 6 g OP emulsifier, adding 50 g of acrylamide and methacryloyloxy-ethyl trimethyl ammonium chloride (ratio 4:1), stirring for 5 min to mix evenly, adding 15 g glutaraldehyde, raising the temperature to 70° C., continuing stirring 4 h, adding of 400 ml aqueous solution containing 0.05 g/ml of ammonium cerium nitrate, and 4 h later, washing and drying to obtain the chitosan cation exchange resins for adding $SiO_2$, namely, conventional resins D.

(3) Preparation of the chitosan cation exchange resins containing $SiO_2$: based on the preparation of conventional resins, the water phase was added 10 g of $SiO_2$ co-modified by TMC-WT and Solsperse-28000. Other steps are the same. Novel resins D was prepared accordingly.

Physicochemical properties of the resins are shown in Table 8. As shown in Table 8, moisture content of the resins containing $SiO_2$ co-modified by TMC-WT and Solsperse-28000 increases 9% as compared to conventional resins for the same exchange capacity.

TABLE 8

Physical and chemical indicators of the chitosan cation exchange resins containing or without $SiO_2$.

| | | Physical and chemical indicators | | | | | |
|---|---|---|---|---|---|---|---|
| Resins | Framework types | Average Particle size (μm) | Moisture content (%) | Exchange capacity (mmol/g) | Average Aperture (nm) | BET Specific surface area (m2/g) | Microporous Surface (m2/g) |
| Novel resins D | SiO2 and chitosan derivatives | 240 | 61 | 2.37 | 5.24 | 3.41 | 1.24 |
| Conventional Resins D | Chitosan derivative | 240 | 52 | 2.38 | 3.85 | 3.27 | 1.59 |

Figure 11:
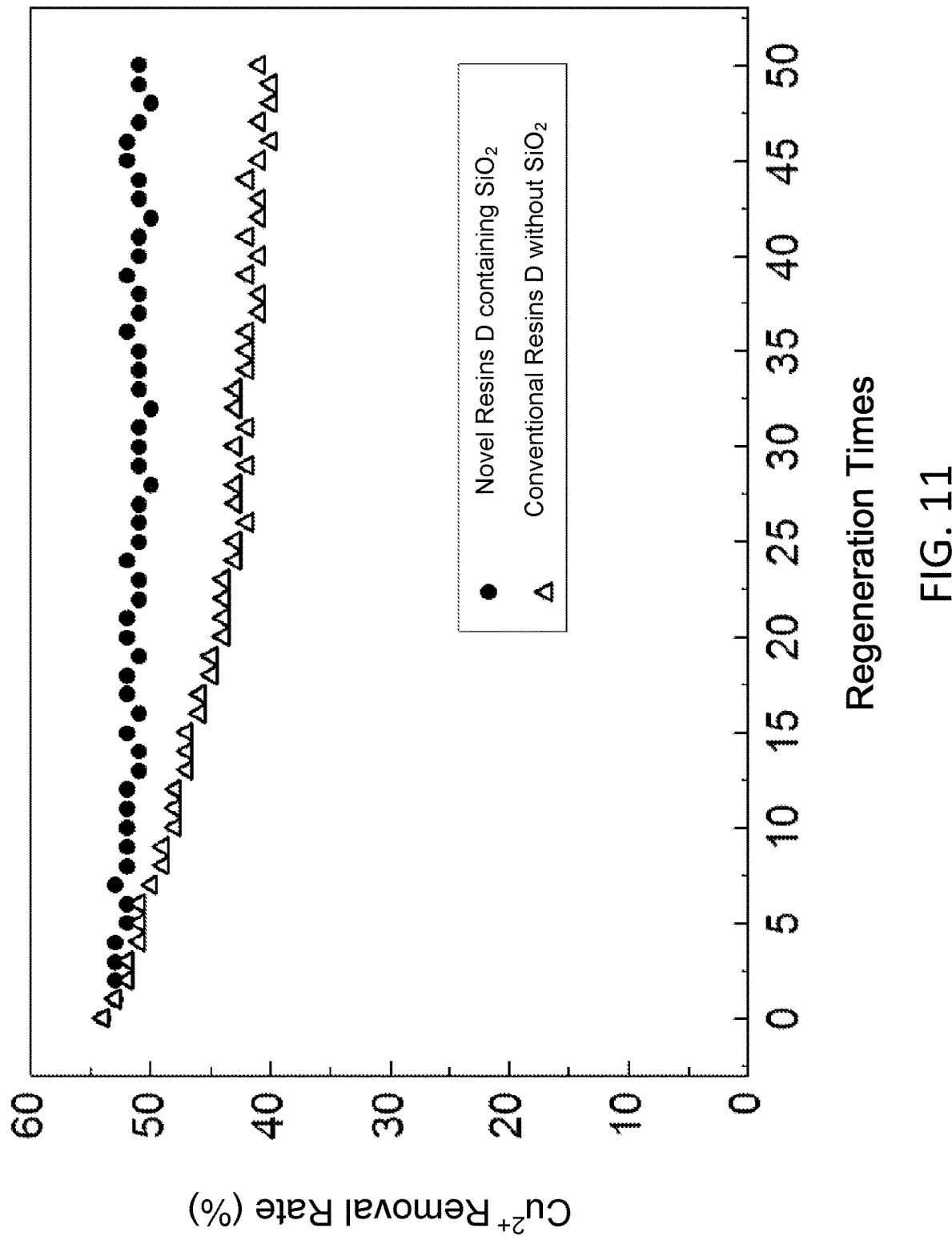
FIG. 11 is a diagram showing removal rates with respect to $Cu^{2+}$ in electroplating wastewater using the novel resins D and the conventional resins D in accordance with Example 8.
Figure 12:
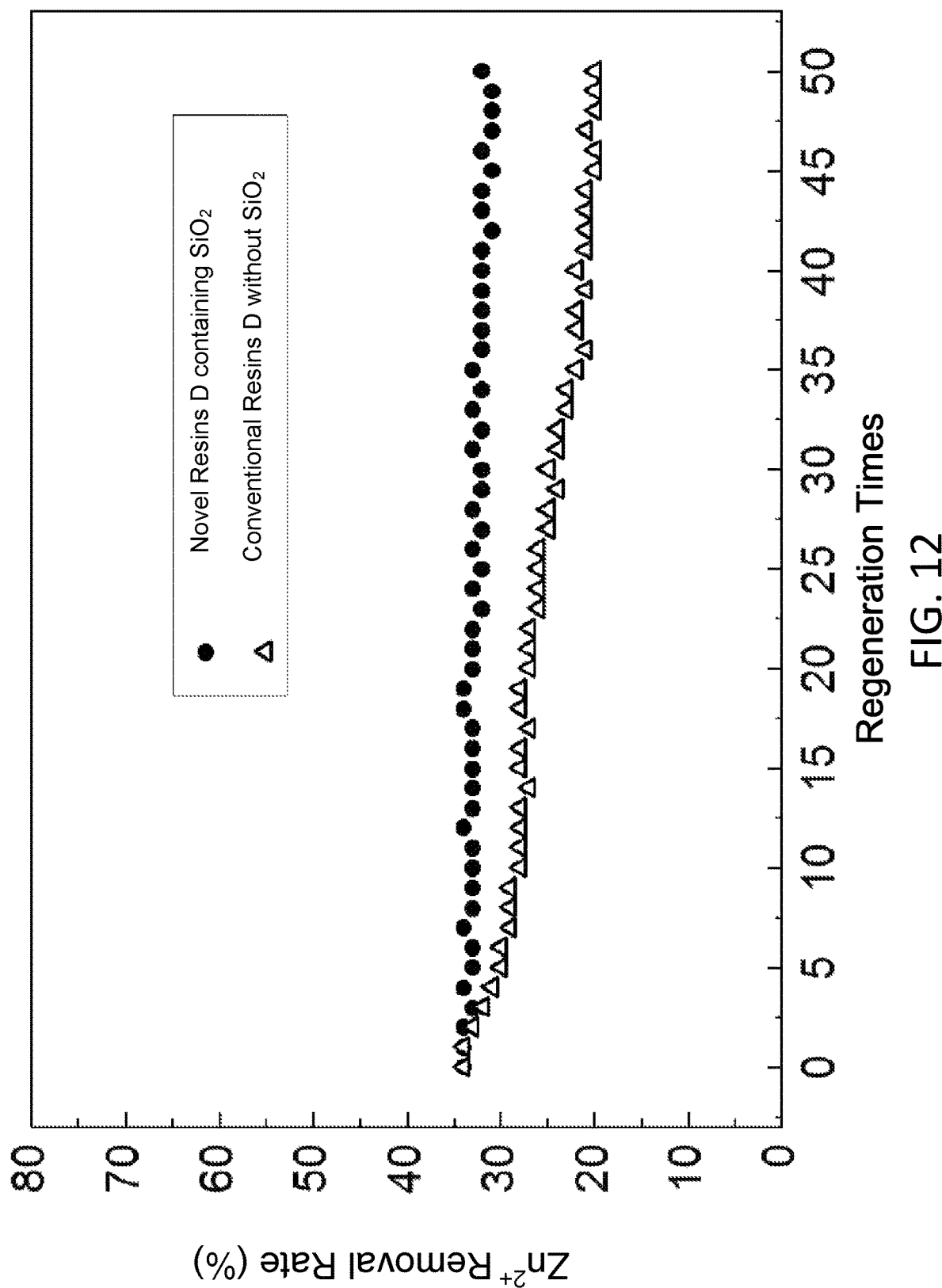
FIG. 12 is relationship chart illustrating removal rates and regeneration times with respect to $Zn^{2+}$ in electroplating wastewater after 50 regenerations using the novel resins D and the conventional resins D in accordance with Example 8.

Chitosan cation exchange resins before and after modification were used to treat electroplating wastewater. The regeneration of the resins is similar to those described in Example 1. Removal rates of chitosan cation exchange resins containing or without $SiO_2$ are shown in FIGS. 11 and 12.

By contrast, removal rates of $Cu^{2+}$, $Zn^{2+}$, $SiO_2$ in dyeing wastewater of the modified resins increase significantly as compared with conventional resins D, and after regenerated 30 times, the removal rates increase by 7%. The resins containing $SiO_2$ co-modified by TMC-WT and Solsperse-28000 show higher removal rates and regeneration stability, as compared to the conventional resins.

Example 9

The implementations relate to a method for improving organic-pollution-resistance of acrylic zwitterionic exchange resins. The method may include the following operations.

(1) Preparation of modified and wrapped inorganic particles is similar to those described in steps (3) and (4) of Example 1. The modifier includes AEO3, modified inorganic particles includes $Al_2O_3$.

(2) preparation of conventional acrylic zwitterionic exchange resins: adding the water phase 500 ml to 1 L three-necked flask, and raising the temperature to 40° C., and stirring for 30 minutes, subsequently, adding 85 g of acrylonitrile, 3 g of benzoyl peroxide, 60 g of toluene, 20 g divinylbenzene, 20 g of styrene and mixing thereof to obtain the oil phase, adding the oil phase to the three-neck flask, stirring for 40 min, raising the temperature, in accordance with 10° C./30 min, to 75° C., incubating for 8 h, washing with ethanol and drying to obtain white balls, adding 15 ml of deionized water, 120 g of sodium hydroxide and 285 ml absolute ethanol to obtain hydrolysis solution, adding white balls, refluxing at 85° C. for 5 h, rising using ethanol, and immersing intohydrochloric acid. Then, the white balls, chlorine ether of which weight is two time of the white balls, and zinc chloride of which weight is ¼ of the resins were added to the reactor and heated to 40° C. The reaction was stirred for 16 h for chloromethylation to obtain chlorine balls. The chlorine balls and 650 ml of diethylamine were added to the reactor, and heated to 50° C. The reaction was stirred for 10 h for amination and washed to obtain acrylic zwitterionic exchange resins for adding $Al_2O_3$, namely, conventional resins E.

(3) Preparation of the acrylic zwitterionic exchange resins containing $SiO_2$: according to the above preparation, the water phase was added 13 g of $Al_2O_3$ modified by AEO3. Other steps are the same, and novel resins E was obtained.

Table 9 shows physicochemical properties of the series of resins. As shown in Table 9, moisture content of the resins containing $Al_2O_3$ increases 7% as compared to conventional resins, while their resin exchange capacity is not affected.

TABLE 9

Physical and chemical indicators of the acrylic zwitterionic exchange resins containing or without Al2O3.

| | | Physical and chemical indicators | | | | | |
|---|---|---|---|---|---|---|---|
| Resins | Framework types | Average Particle size (μm) | Moisture content (%) | Exchange capacity (mmol/g) | Average Aperture (nm) | BET Specific surface area (m2/g) | Microporous Surface (m2/g) |
| Novel resins E | Al2O3 and polyacrylonitrile | 280 | 58 | Positive 2.16 Negative 2.62 | 3.04 | 2.52 | 1.02 |
| Conventional Resins E | Polyacrylonitrile | 280 | 51 | Positive 2.21 Negative 2.64 | 2.75 | 2.89 | 2.04 |

Figure 13:
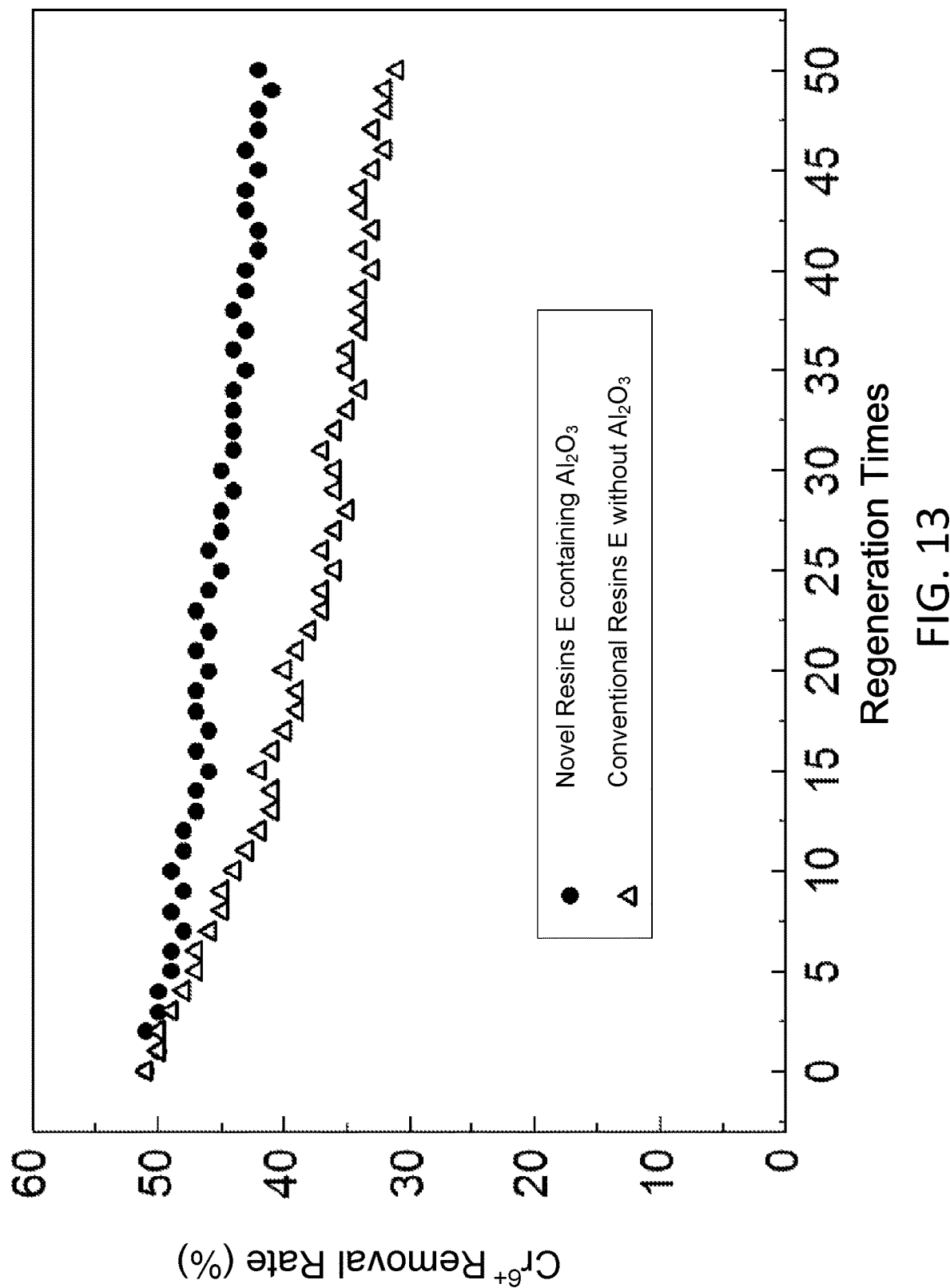
FIG. 13 is relationship chart illustrating removal rates and regeneration times with respect to $Cr^{6+}$ in electroplating wastewater using the novel resins E and the conventional resins E in accordance with Example 9.
Figure 14:
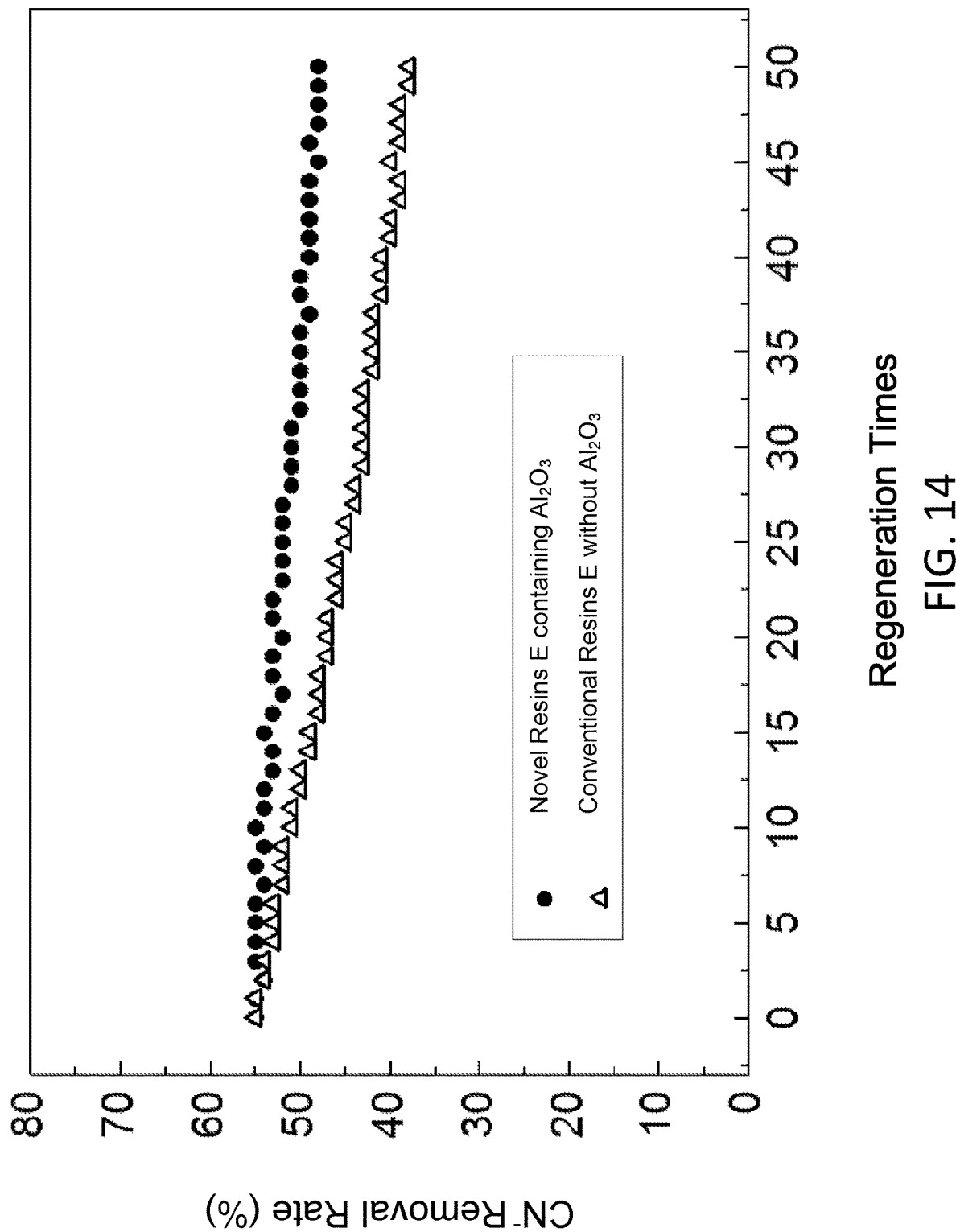
FIG. 14 is relationship chart illustrating removal rates and regeneration times with respect to CN— in electroplating wastewater using the novel resins E and the conventional resins E in accordance with Example 9.

Acrylic zwitterionic exchange resins before and after modification were used to treat electroplating wastewater. The regeneration of the resins is similar to those described in Example 1. Removal rates of acrylic zwitterionic exchange resins containing or without $Al_2O_3$ are shown in FIGS. 13 and 14.

By contrast, removal rates of $Cu^{2+}$ and $CN^-$ in dyeing wastewater of the modified resins containing $Al_2O_3$ increase significantly as compared with conventional resins E, and after regenerated 30 times, the removal rates increase by 8%. The resins containing $Al_2O_3$ show higher removal rates and regeneration stability, as compared to the conventional resins.

No reaction occurs between the modifiers of the present disclosure, and separate or combination of their uses may not change their effects. While bis (dioctyl pyrophosphate group) ethylene titanate and polyester Hyperdispersant are provided in the present disclosure, and other modifiers may be used to achieve the similar effects.

What is claimed is:
1. A method for preparing organic-pollution-resistant ion exchange resins, the method comprising:
   (1) mixing a monomer, a crosslinking agent, and an initiator to obtain an oil phase, wherein a weight ratio between the monomer and the crosslinking agent is about 1:0.02 to 0.45, a weight ratio between the monomer and the initiator is about 1:0.003 to 0.15, and the monomer includes at least one of acrylic acid, methacrylic acid, methyl acrylate, ethyl acrylate, butyl acrylate, methyl methacrylate, butyl methacrylate, acrylonitrile, glycidyl methacrylate, styrene, p-chlorostyrene, divinylbenzene, nitrostyrene, dichloro styrene, methyl styrene polychloroprene, methyl cellulose, carboxymethyl cellulose, sodium alginate, chitosan or derivatives thereof;
   (2) adding 0.2 to 3% by weight of a dispersant to a water phase, wherein a weight ratio between the water phase and the oil phase is about 1:0.4 to 1, and the dispersant includes at least one of polyvinyl alcohol, gelatin, starch, methyl cellulose and derivatives thereof, calcium carbonate, calcium phosphate, talc, diatomaceous earth, bentonite, salt, or silicate;
   (3) adding inorganic particles to a methanol solution to obtain a mixture, stirring the mixture at 20° C. to 90° C. with 30 to 250 rpm for 0.5 h to 4 h, adding a modifier to the mixture and stirring the mixture for 0.5 h to 10 h, and drying the mixture to obtain modified inorganic particles, wherein a weight ratio between the inorganic particles and the methanol solution is about 1:3 to 10, and a weight ratio between the modifier and the inorganic particles is about 1:0.05 to 5; wherein the inorganic particles are selected from at least one kaolin, titanium dioxide, clay, talc, montmorillonite, calcium carbonate, iron, $TiO_2$, $WO_3$, $Fe_3O_4$, $SiO_2$, $ZrO_2$, CuO, $Al_2O_3$, or ZnO, and sizes of the inorganic particles are about 5 nm to 5000 nm;
   (4) adding the modified inorganic particles to the water phase, or the oil phase, wherein a weight ratio between the modified inorganic particles and the monomer is about 0.1% to 30%; wherein as compared to ion exchange resins without the modified inorganic particles, moisture content of the ion exchange resins containing the modified inorganic particles increases 3% to 30%, and after regenerated about 50 times, regeneration efficiency of the ion exchange resins containing the modified inorganic particles increases 1% to 50% with respect to removal of humic acid in biochemical tailwater; and
   (5) adding the oil phase to the stirred water phase for polymerization, by keeping stirring at a speed of 100 to 1500 rpm, keeping the temperature at 50 to 80° C., with a polymerization duration of 2 to 8 hours; afterwards, raising the temperature to 75 to 95° C. and keeping the temperature for about 1 to 15 hours; afterwards, cooling the products, separating resins from the polymerization reaction suspension, and drying the resins after extraction or washing; wherein the order of the steps (1), (2), and (3) are flexible, and the step 4 is performed after the steps (1), (2), and (3), and prior to step 5.

2. The method of claim 1, wherein the modifier includes at least one of γ-chloropropyl trichlorosilane, γ-chloropropyl trimethoxy silane, γ-chloropropyl triethoxysilane, γ-chloropropyl methyl dimethoxy silane, γ-aminopropyl triethoxysilane, γ-(methacryloxypropyl) trimethoxysilane, γ-glycidyl propyl trimethoxy silane, γ-mercaptopropyl trimethoxysilane, γ-mercaptopropyl triethoxysilane, γ-ureido propyl triethoxy silane, γ-(3,2-epoxypropoxy) methyl trimethoxysilane, γ-(ethylenediamine) aminopropyltrimethoxysilane, N-β-(aminoethyl)-γ-aminopropyl trimethoxy silane, N-β-(aminoethyl)-γ-aminopropyl methyl dimethoxy silane, vinyltriethoxysilane, vinyltrimethoxysilane, bis-[3-(triethoxysilyl) silylpropyl] tetrasulfide, diethylenetriaminepentaacetic aminopropyl trimethoxysilane, γ-ethylene amino triethoxysilane, A-(ethylenediamine-yl) methyl triethoxysilane, methyl triethoxysilane aniline, aniline methyl trimethoxysilane, bis (3-triethoxysilylpropyl silyl propyl) tetrasulfide carbon, cyclohexyl methyl dimethoxysilane, isopropyl tri (dioctyl pyrophosphate acyloxy) titanate, isopropyl tri (dioctyl phosphate acyloxy) titanate, isopropyl dioleate acyloxy group (acyloxy dioctyl phosphate) titanate, mono alkoxylated unsaturated fatty acid titanate, bis (dioctyl pyrophosphate group) ethylene titanate triethanolamine esters and chelates, pyrophosphate type monoalkoxy titanate type, a phosphoric acid compound class monoalkoxy titanates, alkanolamine titanate, di (octyl phenol ethoxylates) phosphate ester, tetraisopropyl bis (octyl acid phosphate group) titanate, polyester hyperdispersant, fatty alcohol ethoxylates, or cetyl trimethyl ammonium chloride.

3. An organic-pollution-resistant ion exchange resins comprising the ion exchange resins prepared in claim 1.

4. A method for using the organic-pollution-resistant ion exchange resins containing the modified inorganic particles prepared using the method of claim 1, comprising:
   treating biochemical tailwater of municipal wastewater using the resins of claim 1, wherein, as compared to ion exchange resins without the modified inorganic particles:
   regeneration efficiency of the resins with respect to removal of tannic acid in the biochemical tailwater increases 0.6% to 39%;
   regeneration efficiency of the resins removing $UV_{254}$ of the biochemical tailwater increases 1% to 40%; and
   regeneration efficiency of the resins with respect to removal of SUVA of the biochemical tailwater increases 0.8% to 46%.

5. A method for using organic-pollution-resistant ion exchange resins containing the modified inorganic particles prepared in claim 1, the method comprising:
   treating biochemical tailwater of dyeing wastewater using the resins, wherein, as compared to ion exchange resins without the modified inorganic particles:
   regeneration efficiency of the resins with respect to removal of $UV_{254}$ in the biochemical tailwater increases 1% to 40%;
   regeneration efficiency of the resins with respect to removal of TOC in the biochemical tailwater increases 0.5% to 35%; and
   regeneration efficiency of the resins with respect to removal of $COD_{Cr}$ in the biochemical tailwater increases 1% to 28%.

6. A method for using organic-pollution-resistant ion exchange resins containing the modified inorganic particles prepared in claim 1, the method comprising:
   treating surface water, drinking water and food source wastewater using the resins, wherein, as compared to ion exchange resins without the modified inorganic particles:
   regeneration efficiency of the resins with respect to removal of DOC of the surface water increases 0.5% to 45%;

regeneration efficiency of the resins with respect to removal of $UV_{254}$ in the surface water increases 1% to 40%;

regeneration efficiency of the resins with respect to removal of $COD_{Cr}$ in the food wastewater increases 1% to 28%.

7. A method for using organic-pollution-resistant ion exchange resins containing the modified inorganic particles prepared in claim 1, the method comprising:

treating metallurgical wastewater and coking wastewater using the resins, wherein, as compared to ion exchange resins without the modified inorganic particles:

regeneration efficiency of the resins with respect to removal of $COD_{Cr}$ in CN— in the coking wastewater increases 1% to 55%; and regeneration efficiency of the resins with respect to removal of $AsO_3$ in the metallurgical wastewater increases 1% to 55%.

8. A method for using organic-pollution-resistant ion exchange resins containing the modified inorganic particles prepared in claim 1, the method comprising:

treating electroplating wastewater, wherein, as compared to ion exchange resins without the modified inorganic particles:

regeneration efficiency of the resins with respect to removal of $Cu^{2+}$ in the electroplating wastewater increases 0.5% to 58%; and regeneration efficiency of the resins with respect to removal of $Zn^{2+}$ in the electroplating wastewater increases 0.4% to 42%.

9. A method for using organic-pollution-resistant ion exchange resins containing the modified inorganic particles prepared in claim 1, the method comprising:

treating electroplating wastewater using the resins, wherein, as compared to ion exchange resins without the modified inorganic particles, regeneration efficiency of the resins with respect to removal of $Cd^{2+}$, $Pb^{2+}$, $Ni^{2+}$, $Cr^6$, or CN— of the electroplating wastewater increases 0.5% to 50%.

* * * * *